(12) United States Patent
Chung et al.

(10) Patent No.: US 7,521,652 B2
(45) Date of Patent: Apr. 21, 2009

(54) CONTROLLED COOLING METHODS AND APPARATUS FOR LASER SINTERING PART-CAKE

(75) Inventors: Tae Mark Chung, San Diego, CA (US); Raymond J. Bishop, Santa Clarita, CA (US); Bradley David Geving, Huntington Beach, CA (US); Jon Jody Fong, Calabasas, CA (US); Patrick Dunne, Hemel Hempstead (GB)

(73) Assignee: 3D Systems, Inc., Rock Hill, SC (US)

( * ) Notice: Subject to any disclaimer, the term of this patent is extended or adjusted under 35 U.S.C. 154(b) by 394 days.

(21) Appl. No.: 11/005,740

(22) Filed: Dec. 7, 2004

(65) Prior Publication Data
US 2006/0118532 A1 Jun. 8, 2006

(51) Int. Cl.
*B23K 26/14* (2006.01)
*B22F 7/00* (2006.01)

(52) U.S. Cl. .............. 219/121.84; 219/121.85; 419/7; 264/497

(58) Field of Classification Search .............. 219/121.6, 219/121.64, 121.84; 264/125, 629–631, 264/497; 419/26, 5–7, 45, 47; 156/272.8; 148/514; 700/118
See application file for complete search history.

(56) References Cited

U.S. PATENT DOCUMENTS

| | | | |
|---|---|---|---|
| 3,973,762 A * | 8/1976 | Cappel | 266/135 |
| 3,986,138 A * | 10/1976 | Neal | 60/267 |
| 4,247,508 A | 1/1981 | Housholder | |
| 4,697,631 A * | 10/1987 | Bungeroth et al. | 164/46 |
| 4,740,352 A * | 4/1988 | Takahashi | 419/23 |
| 4,817,858 A * | 4/1989 | Verpoort | 228/193 |
| 4,849,154 A * | 7/1989 | Masumoto | 264/539 |
| 4,863,538 A | 9/1989 | Deckard | |
| 4,944,817 A | 7/1990 | Bourell et al. | |
| 5,132,143 A | 7/1992 | Deckard | |

(Continued)

FOREIGN PATENT DOCUMENTS

DE 3445613 C * 7/1985

(Continued)

OTHER PUBLICATIONS

European Search Report, Application No. 05257444.9; Report Issue Date: Apr. 4, 2006; Examiner: von Zitzewitz, A.; 8 pages.

*Primary Examiner*—Samuel M Heinrich
(74) *Attorney, Agent, or Firm*—Ralph D'Alessandro; Keith A. Roberson

(57) ABSTRACT

The invention is a method for controllably cooling at least a portion of a part-cake from a laser sintering system to minimize cool down time, maximize throughput, and minimize thermal gradients within the part-cake. The method generally comprises forming one or more thermal transfer channels within the part-cake. The thermal transfer channels can include ducts and cooling fins in the part-cake surrounding the formed part. The method can further comprise removing unfused powder from the ducts and introducing cooling media into the ducts. The invention also includes a part-cake having thermal transfer channels formed therein and a laser sintering apparatus comprising a part-cake containing cylinder having permanent fittings therein for receiving terminal portions of thermal transfer channels formed in the part-cake.

25 Claims, 13 Drawing Sheets

U.S. PATENT DOCUMENTS

| | | | |
|---|---|---|---|
| 5,204,055 A * | 4/1993 | Sachs et al. | 419/2 |
| 5,303,141 A * | 4/1994 | Batchelder et al. | 700/29 |
| 5,304,329 A * | 4/1994 | Dickens et al. | 264/497 |
| 5,527,877 A * | 6/1996 | Dickens et al. | 528/323 |
| 5,622,216 A * | 4/1997 | Brown | 164/71.1 |
| 5,622,577 A | 4/1997 | O'Connor | |
| 5,732,323 A * | 3/1998 | Nyrhila | 419/2 |
| 5,753,274 A | 5/1998 | Wilkening et al. | |
| 5,798,469 A | 8/1998 | Nufer | |
| 5,846,370 A | 12/1998 | O'Connor | |
| 5,937,265 A * | 8/1999 | Pratt et al. | 419/6 |
| 5,993,297 A * | 11/1999 | Hyatt et al. | 451/53 |
| 6,042,774 A | 3/2000 | Wilkening et al. | |
| 6,269,540 B1 * | 8/2001 | Islam et al. | 29/889.7 |
| 6,531,086 B1 * | 3/2003 | Larsson | 264/497 |
| 6,554,600 B1 | 4/2003 | Hofmann et al. | |
| 6,656,409 B1 * | 12/2003 | Keicher et al. | 264/401 |
| 6,682,688 B1 * | 1/2004 | Higashi et al. | 264/497 |
| 6,811,744 B2 * | 11/2004 | Keicher et al. | 419/5 |
| 6,932,935 B1 * | 8/2005 | Oberhofer et al. | 264/497 |
| 7,134,813 B2 * | 11/2006 | Kleiner | 408/59 |
| 7,378,052 B2 * | 5/2008 | Harryson | 419/7 |
| 2002/0057627 A1 * | 5/2002 | Schubert et al. | 366/336 |
| 2003/0206820 A1 * | 11/2003 | Keicher et al. | 419/9 |
| 2004/0012124 A1 * | 1/2004 | Li et al. | 264/460 |
| 2005/0278933 A1 * | 12/2005 | Macke et al. | 29/525.02 |
| 2006/0051233 A1 * | 3/2006 | Ugai et al. | 419/6 |
| 2007/0001342 A1 * | 1/2007 | Oberhofer et al. | 264/237 |
| 2007/0023977 A1 * | 2/2007 | Braun et al. | 264/497 |
| 2008/0036117 A1 * | 2/2008 | Hickerson et al. | 264/405 |

FOREIGN PATENT DOCUMENTS

| | | |
|---|---|---|
| DE | 003908996 A1 * | 9/1990 |
| JP | 403146603 A * | 6/1991 |

* cited by examiner

CONTROLLED COOLING METHODS AND APPARATUS FOR LASER SINTERING PART-CAKE

FIELD OF THE INVENTION

The invention is directed to a method and apparatus for controlling the cooling rate of a part-cake in a laser sintering apparatus, the part-cake containing unfused powder and built parts of fused powder.

BACKGROUND

Solid freeform fabrication processes are increasingly used for producing freeform, complex geometry components. In particular, selective laser sintering is useful for creating three dimensional objects directly from digital data (e.g., computer-aided-design (CAD) databases, medical scan imaging files, etc.) in an automated fashion. An object is created through a sequential fusion buildup of cross sections of the finished part from a starting powder. The powder is fused with a scanning laser beam one layer at a time, and each scanned layer corresponds to a cross section of the final object's mathematically sectioned digital data model.

Detailed descriptions of selective laser sintering technology are provided in U.S. Pat. Nos. 4,863,538; 4,944,817; and 5,132,143, all assigned to the Board of Regents, The University of Texas System, and in U.S. Pat. No. 4,247,508 to Housholder.

Laser sintering is a thermally based process. The sources of thermal energy are typically heaters for the part bed, cylinder heaters to preheat the powder in powder feed cylinders, and the laser. The laser is typically a $CO_2$ laser that scans the fresh powder layer to selectively fuse powder particles in the desired areas. The powder is normally kept near the fusion temperature of the particular powder so that the added heat required by the laser to fuse the part is minimized. The part-cake (essentially comprising a block of fused and unfused powder) remaining after the completed layerwise build process is hot.

Before the laser sintering process can be restarted to build a new part or series of parts, the part-cake is cooled down to a handling temperature safe for the personnel handling the apparatus and acceptable for removing the built parts without damage to the parts. Powder materials commonly used in laser sintering have comparatively poor thermal conductivity and so can take a long time to cool down to workable temperatures, particularly at the interior portions of the part-cake. The time required for cool down of the part-cake is further increased as larger build areas are use (i.e., one or more of the X, Y, or Z dimension of the part cake is increased). The increased cool-down time reduces efficiency of the laser sintering process by increasing the residence time for each part build session, thereby decreasing throughput of the laser sintering system.

The cool down portion of the laser sintering process can be detrimental to the built parts if the cooling is non-uniform throughout the part-cake causing uncontrolled thermal gradients therein. Non-uniform cooling can lead to unacceptable geometric distortions of the built parts in the part-cake, as well as inconsistent mechanical properties of the built parts.

SUMMARY OF THE INVENTION

In one aspect of the invention, there is provided a method for controlling the cooling rate of at least a portion of a part-cake in a laser sintering system, the part-cake including unfused powder and one or more built parts of fused powder. In one embodiment of this aspect of the invention, the method comprises selectively forming one or more thermal transfer channels in at least a portion of the part-cake. The thermal transfer channels can comprise solid-walled ducts. The ducts can be formed by laser sintering during a layerwise build process. Alternately, the ducts can be inserted after the build process through tunneling methods. The ducts also can be formed after the build process at the time of insertion of a solid cooling media. For example, the channels could be formed by inserting a solid thermally conductive probe into the unfused powder in the part-cake. The thermal transfer channels can also comprise materials that are essentially solid throughout. In one preferred embodiment, the thermal transfer channels comprise solid cooling fins of fused powder, the fins being formed by laser sintering during the layerwise build process.

In another embodiment, the method of the invention comprises forming, by laser sintering, one or more ducts in at least a portion of the part-cake during a layerwise build process. The method further comprises removing unfused powder from the ducts, and introducing cooling media into the ducts. The ducts can be single-walled or multi-walled, with each duct preferably having two terminal portions at the open, top surface of the part-cake. In a particularly preferred embodiment, a powder removal tool is formed within the ducts by laser sintering during the layerwise build process. The powder removal tool can take on various forms beneficial for aiding in removal of unfused powder from the ducts to facilitate cooling.

According to another embodiment of the invention, the method comprises forming one or more multi-walled ducts in at least a portion of the part-cake by laser sintering during a layerwise build process. Preferentially, the multi-walled ducts comprise an inner wall and one or more outer walls, wherein the inner wall defines a core of unfused powder within the outer walls. The method further comprises removing the core of unfused powder and introducing cooling media into the ducts. In a particularly preferred embodiment, two ducts are formed, each being open at the top surface of the part-cake and extending diagonally downward into the part-cake, the two ducts meeting at a point within the part-cake. According to this embodiment, removal of the cores formed in each of the two ducts results in formation of a single continuous duct that is substantially V-shaped.

In still another embodiment of the invention, the method comprises forming one or more ducts in at least a portion of a part-cake by laser sintering during a layerwise build process, wherein the ducts have open terminal portions at the top portion of the part-cake and closed terminal portions within the part-cake. The method further comprises removing unfused powder from the ducts and introducing cooling media into the ducts. In one particular embodiment, the cooling media is a gaseous media. According to this embodiment, the formed ducts are preferentially at least semi gas-permeable. Further, preferentially, the open terminal portions are sealed after formation or installation of gas supply fittings. The gaseous cooling media can then be introduced into the duct under pressure sufficient to facilitate migration of the gaseous cooling media out of the ducts, through the unfused powder and around the built parts in the part-cake, and out to the atmosphere through the portion of the part-cake open to the atmosphere. In another particular embodiment, the cooling media is a liquid cooling media. According to this embodiment, the ducts are essentially reservoirs, preferentially liquid tight, for the cooling liquid. The liquid can be re-circulated in the reservoir through use of an external recirculating apparatus, which preferably also functions as a heat exchange apparatus, removing warmed liquid from the reservoir and returning cooled liquid to be circulated therein. It is beneficial, according to this embodiment, for the formed ducts to be multi-walled, the unfused powder being removed from the space defined by an inner wall, but the unfused powder being left in the annular space between the inner wall and one or more outer walls.

According to another embodiment of the invention, there is provided a method for controlling the cooling rate of at least a portion of a part-cake having therein unfused powder and one or more built parts, the method comprising selectively forming one or more cooling fins comprising fused powder in at least a portion of the part-cake. Preferentially, the cooling fins are at least partially conformal with the built parts within the part-cake, being selectively positioned for effectively transferring heat away from the parts to the top surface of the part-cake. In one particular embodiment, the ends of the cooling fins at the top surface of the part-cake are attached to an external heat exchange apparatus for further heat removal.

According to still another embodiment of the invention, there is provided a method for controlling the cooling rate of at least a portion of a part-cake having therein unfused powder and one or more built parts, the method comprising forming one or more thermal transfer channels in at least a portion of the part-cake by inserting at least a portion of one or more solid cooling media into the part-cake. The solid cooling media can include any solid material generally known to be thermally conductive, such as thermally conductive probes. In one particular embodiment, the ends of the solid cooling media at the top surface of the part-cake are attached to an external heat exchange apparatus for further heat removal.

According to another aspect of the invention, there is provided a laser sintering apparatus. In one embodiment, the apparatus comprises a part-cake containing cylinder having sidewalls, an open top, and a bottom defined by a piston. The cylinder comprises one or more fittings for receiving the terminal portion of a cooling duct formed in the part-cake during a layerwise building process. In one particular embodiment, the fittings are in the sidewalls of the cylinder. In another particular embodiment, the fittings are in the piston.

According to yet another aspect of the invention, there is provided a part-cake from a laser sintering process, wherein the part-cake comprises one or more thermal cooling channels. In one preferred embodiment, the thermal cooling channels include ducts, which can be single-walled or multi-walled. In another preferred embodiment, the thermal cooling channels include cooling fins. Preferentially, the cooling fins are at least partially conformal to one or more built parts within the part-cake.

BRIEF DESCRIPTION OF THE DRAWINGS

Figure 1:
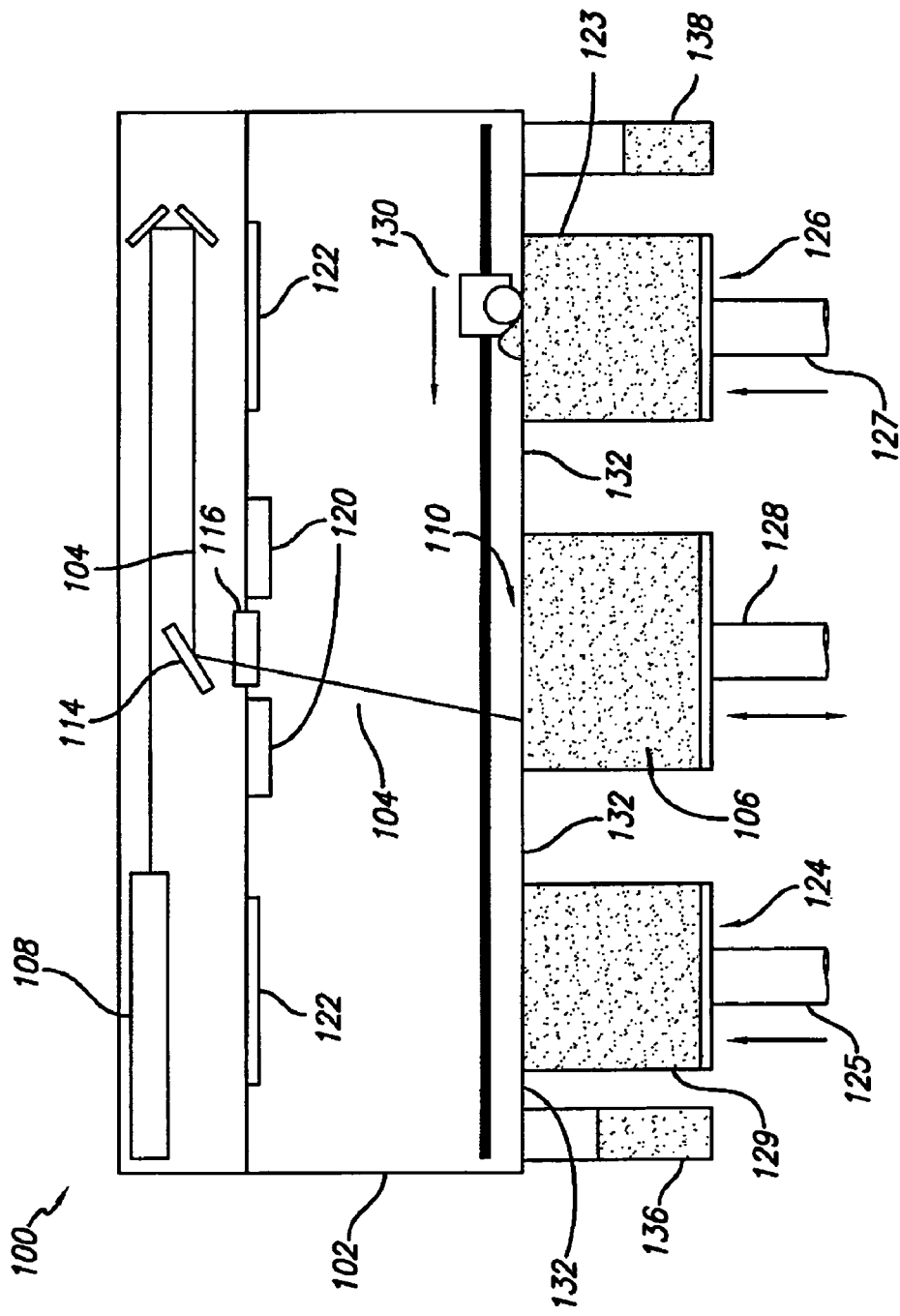
Figure 2:
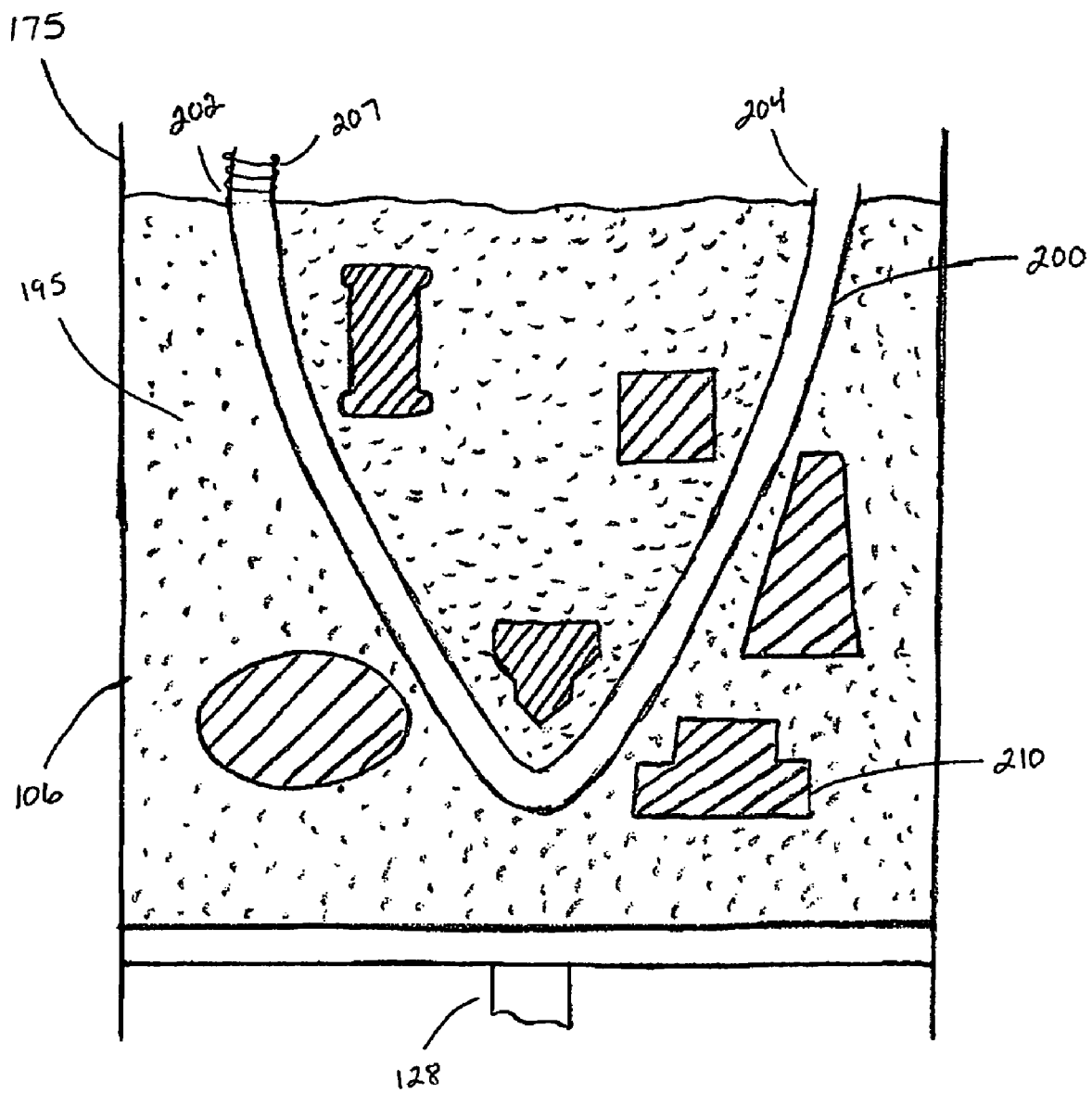
Figure 3:
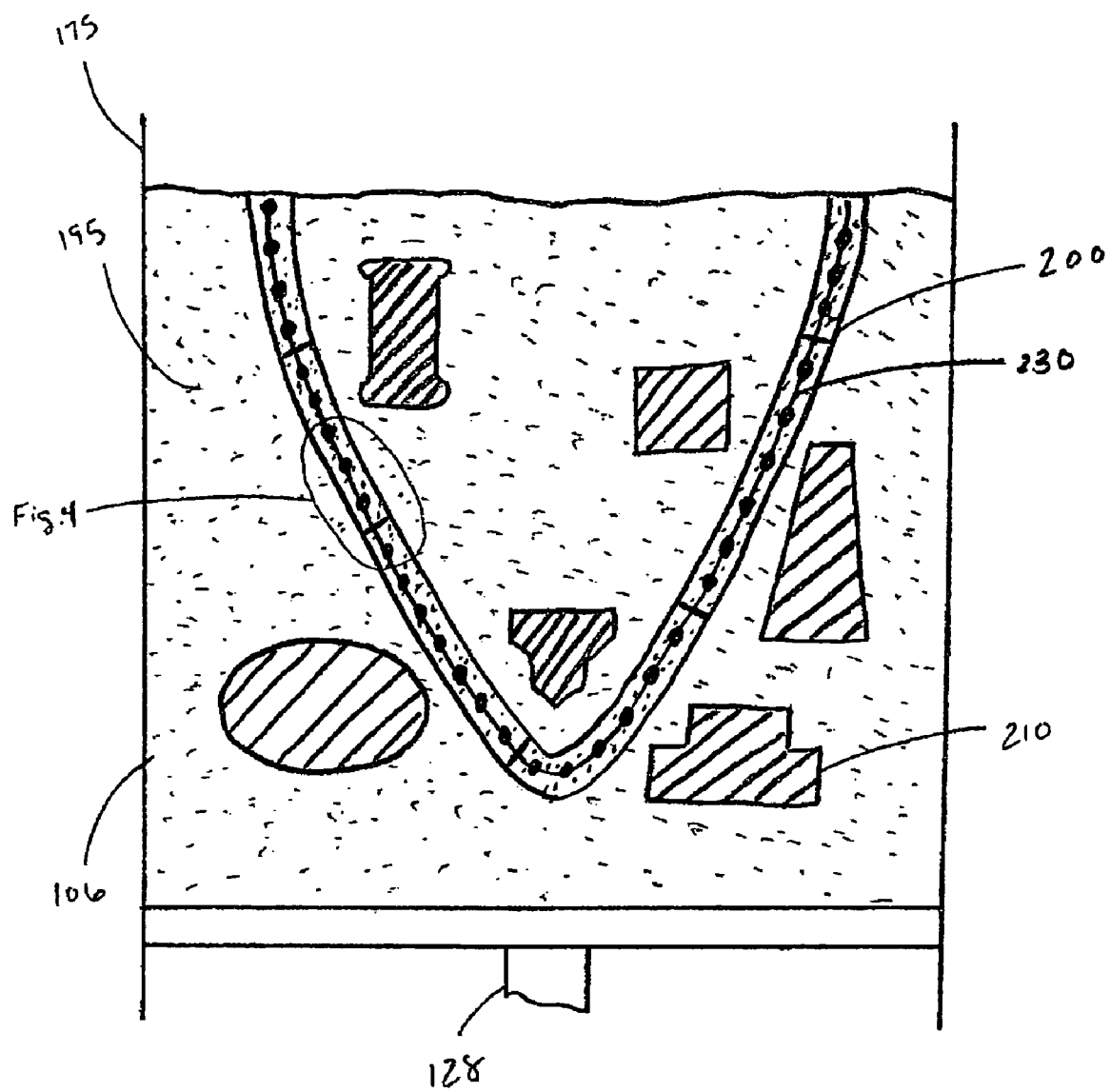
Figure 4:
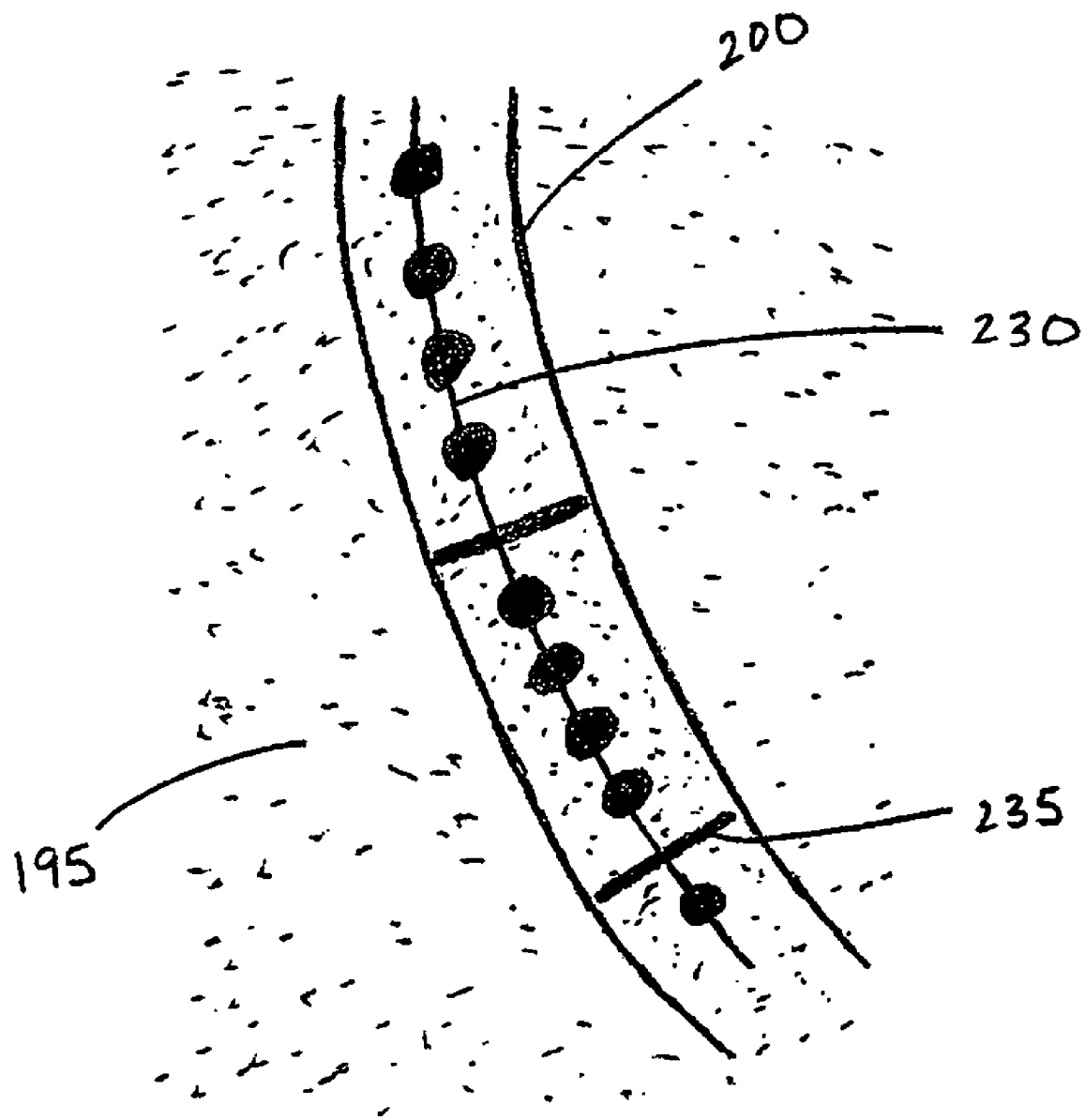
Figure 5:
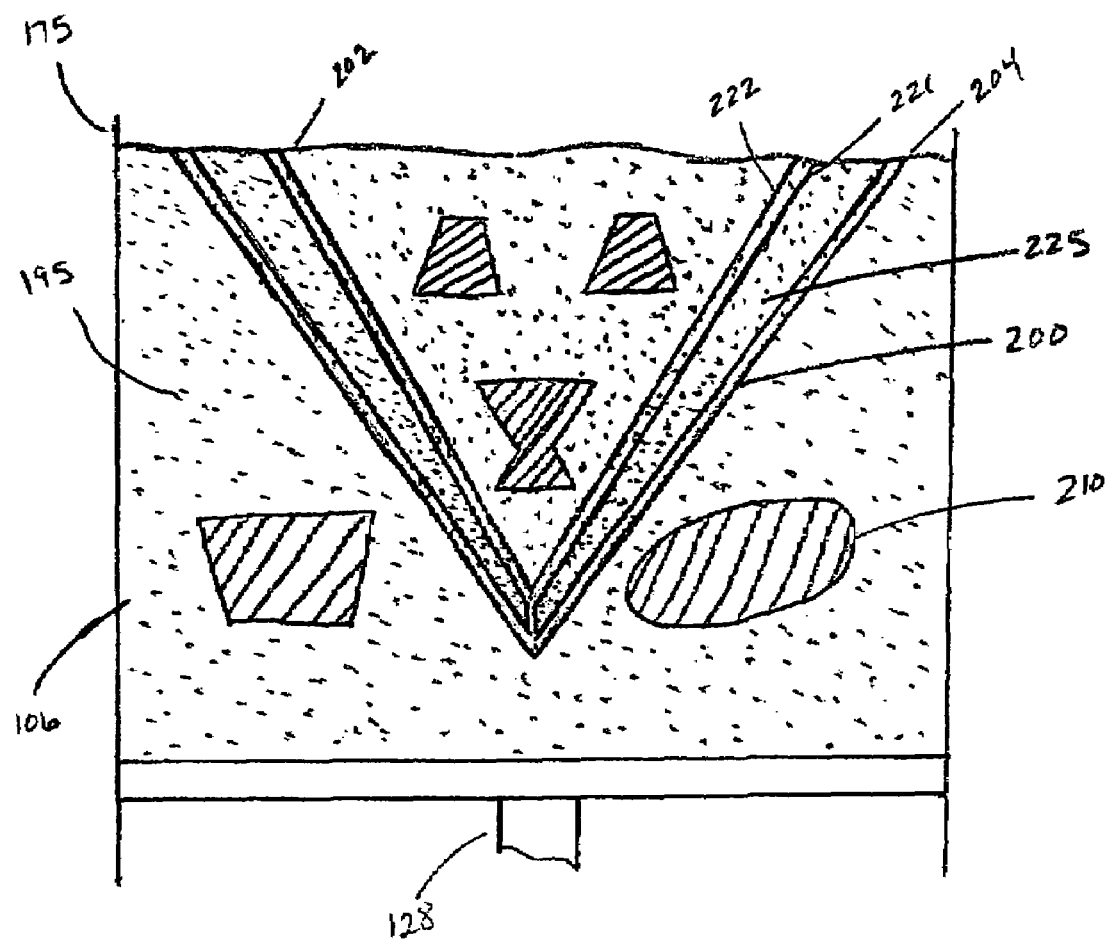
Figure 6:
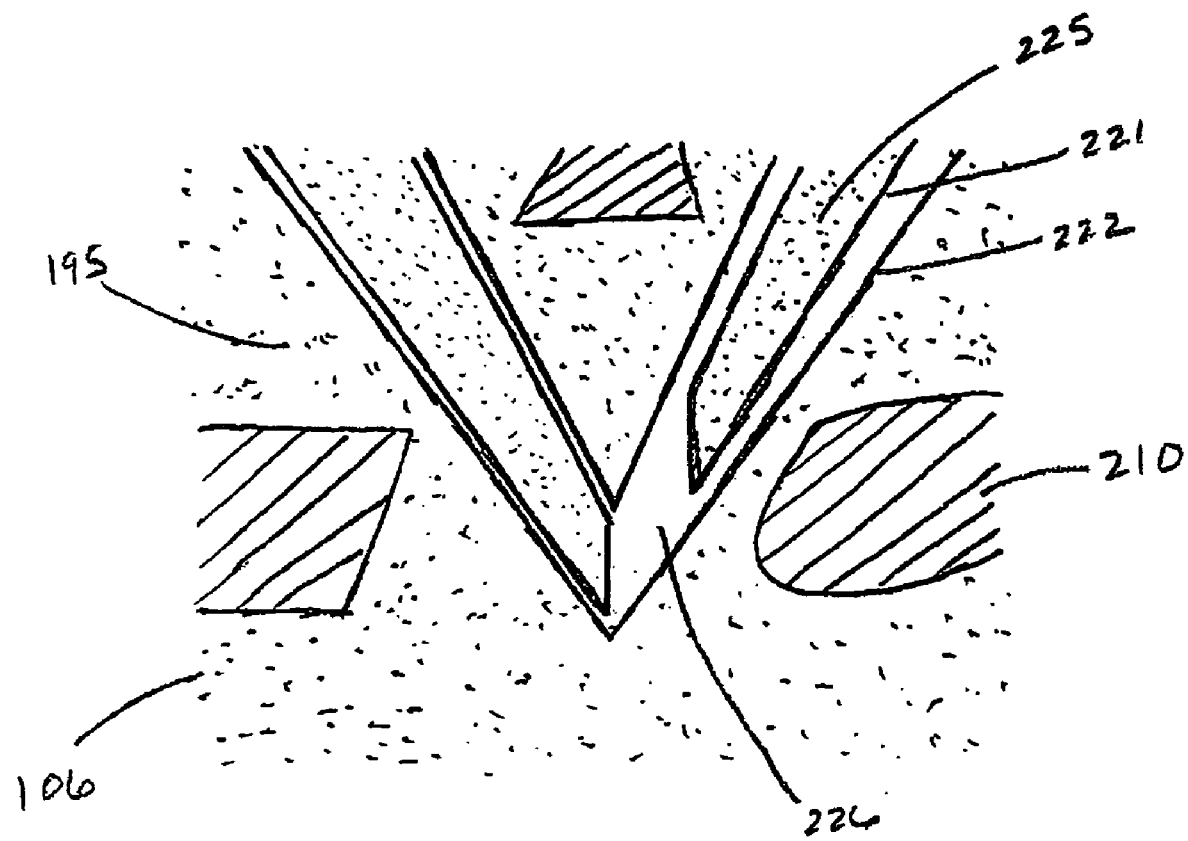
Figure 7:
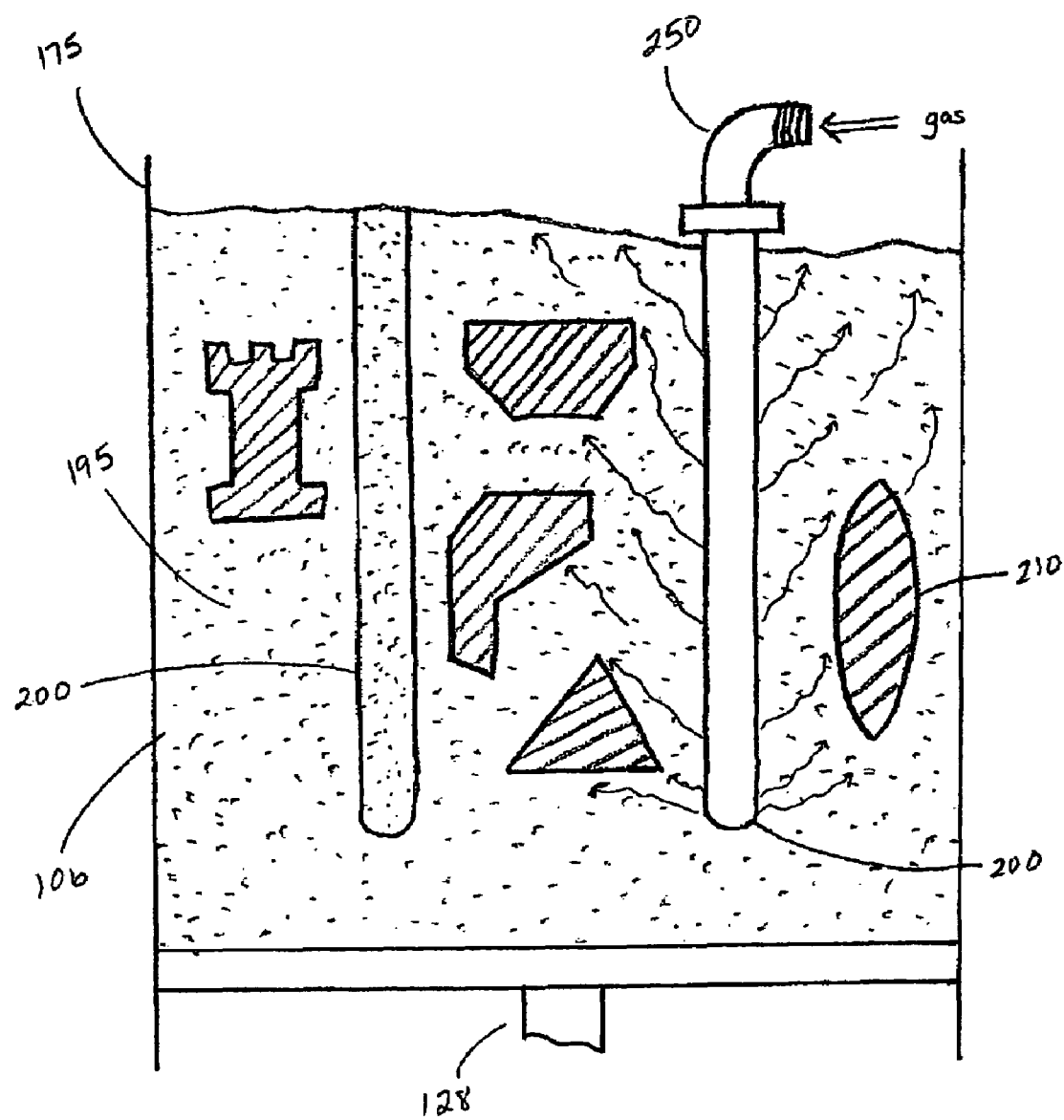
Figure 8:
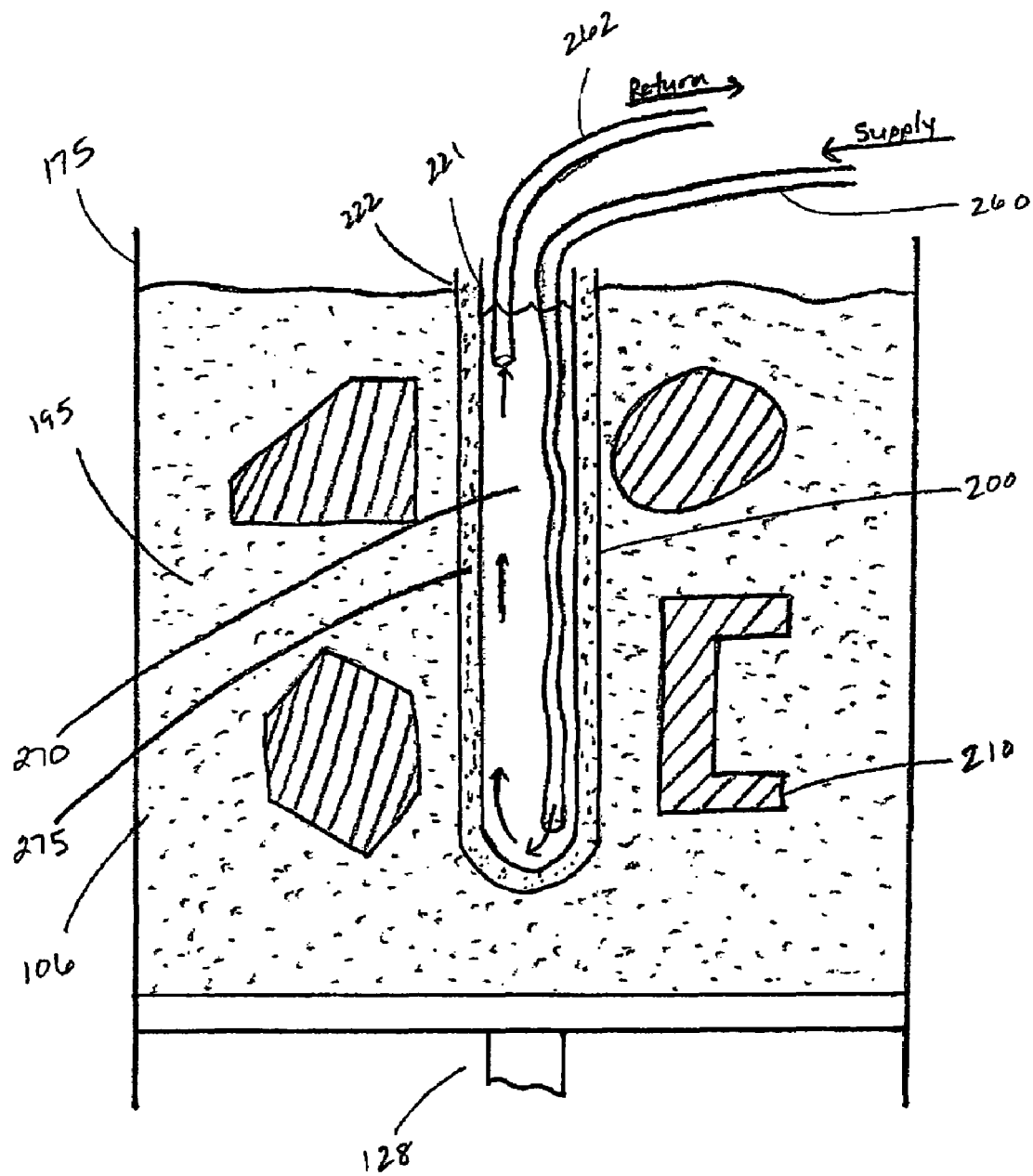
Figure 9:
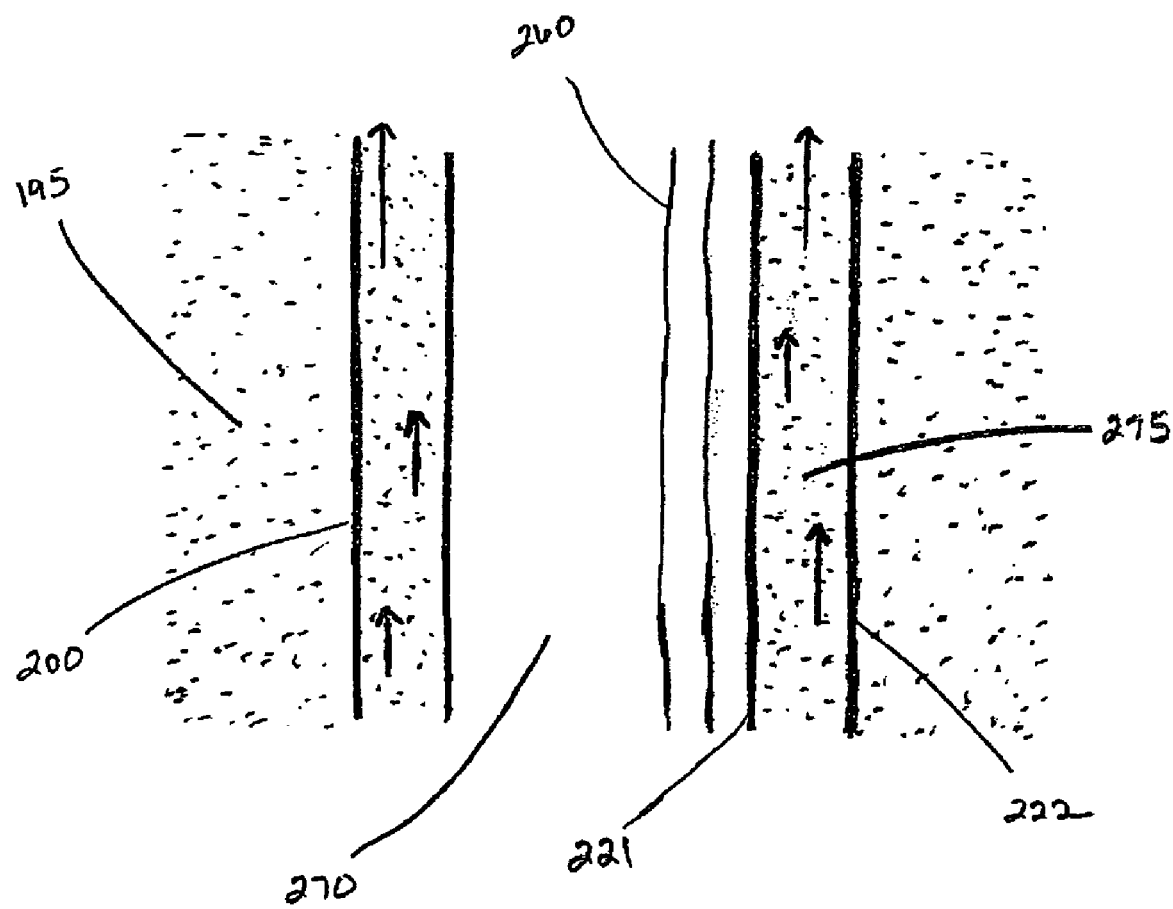
Figure 10:
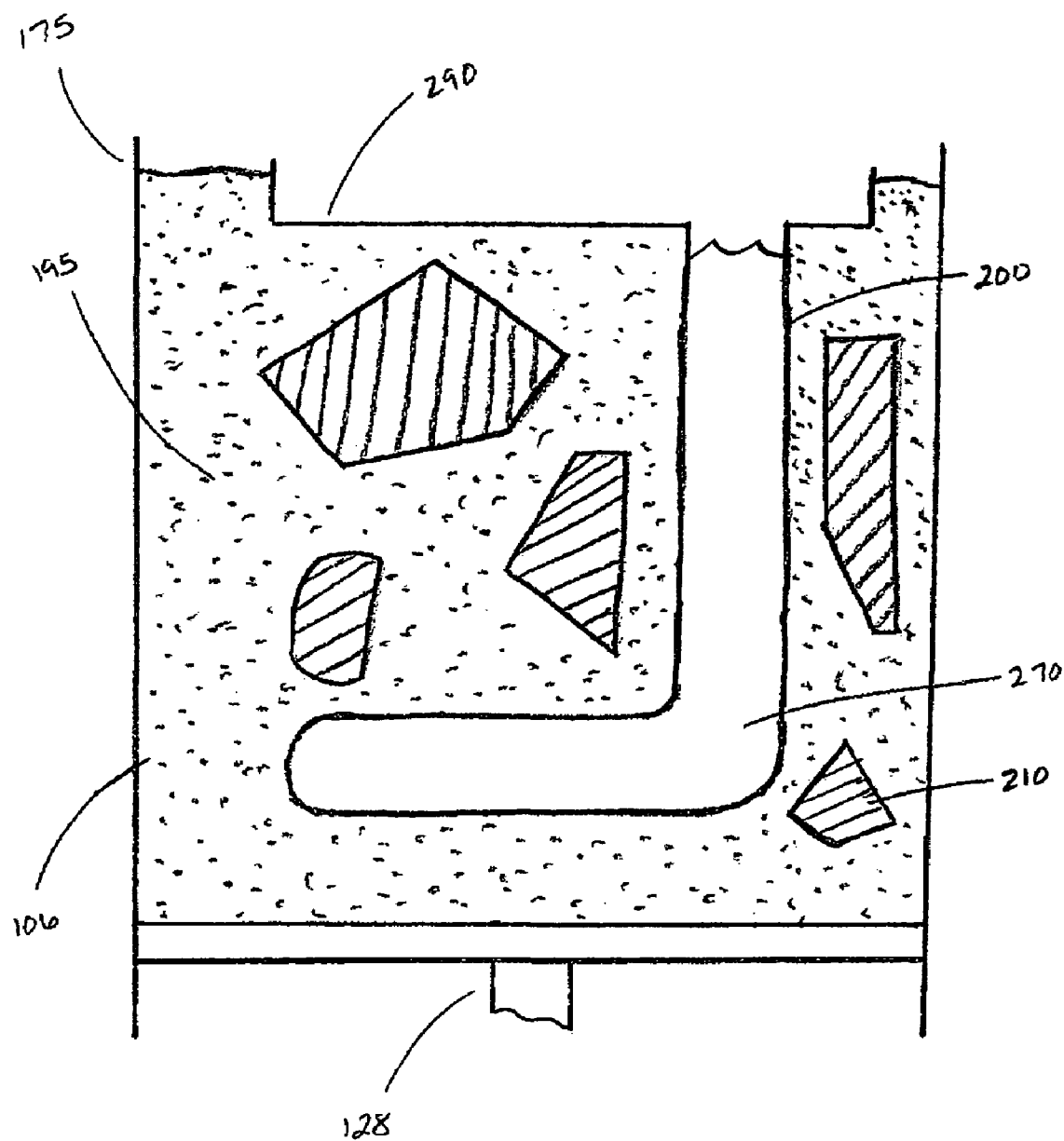
Figure 11:
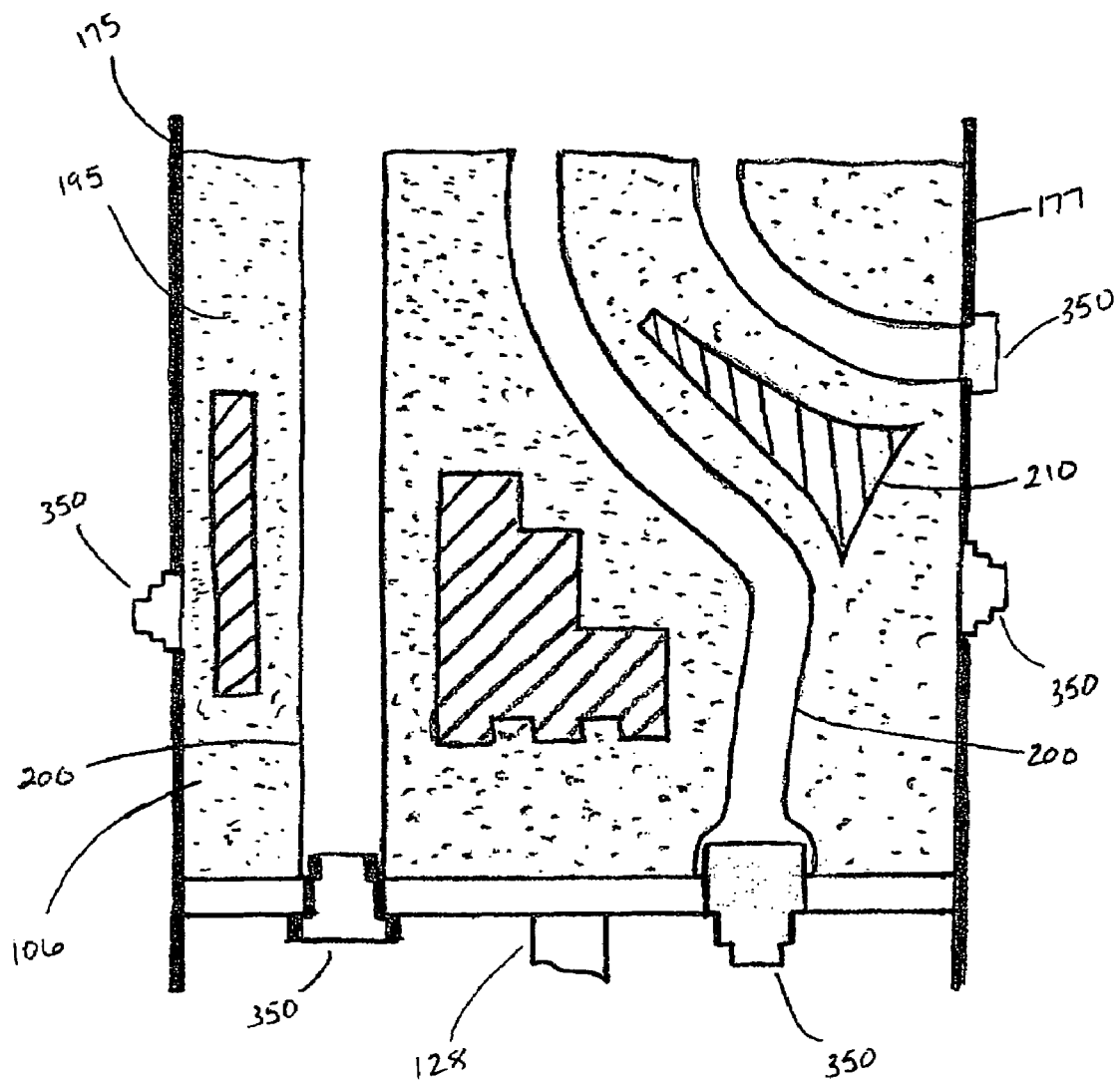
Figure 12:
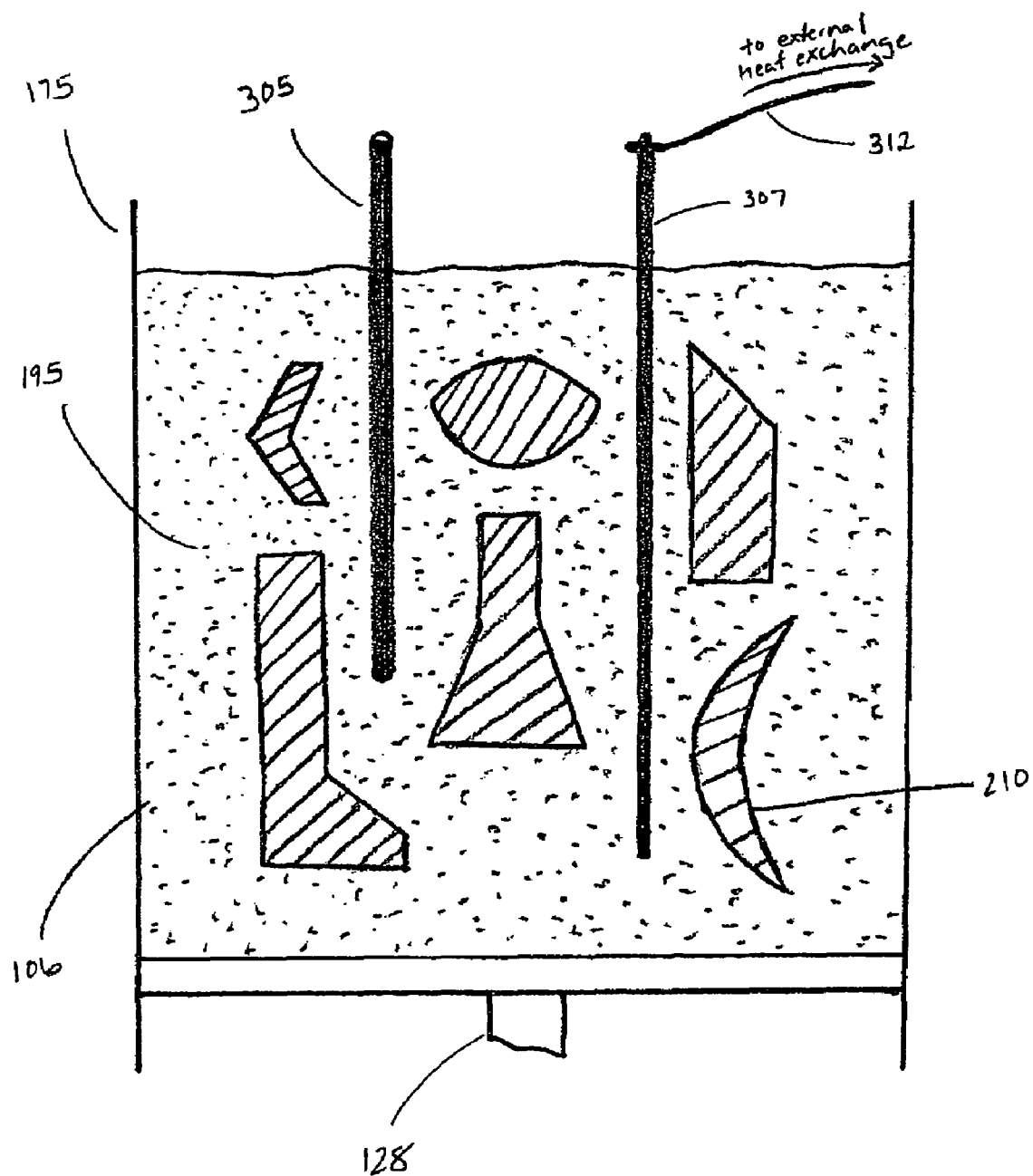
Figure 13:
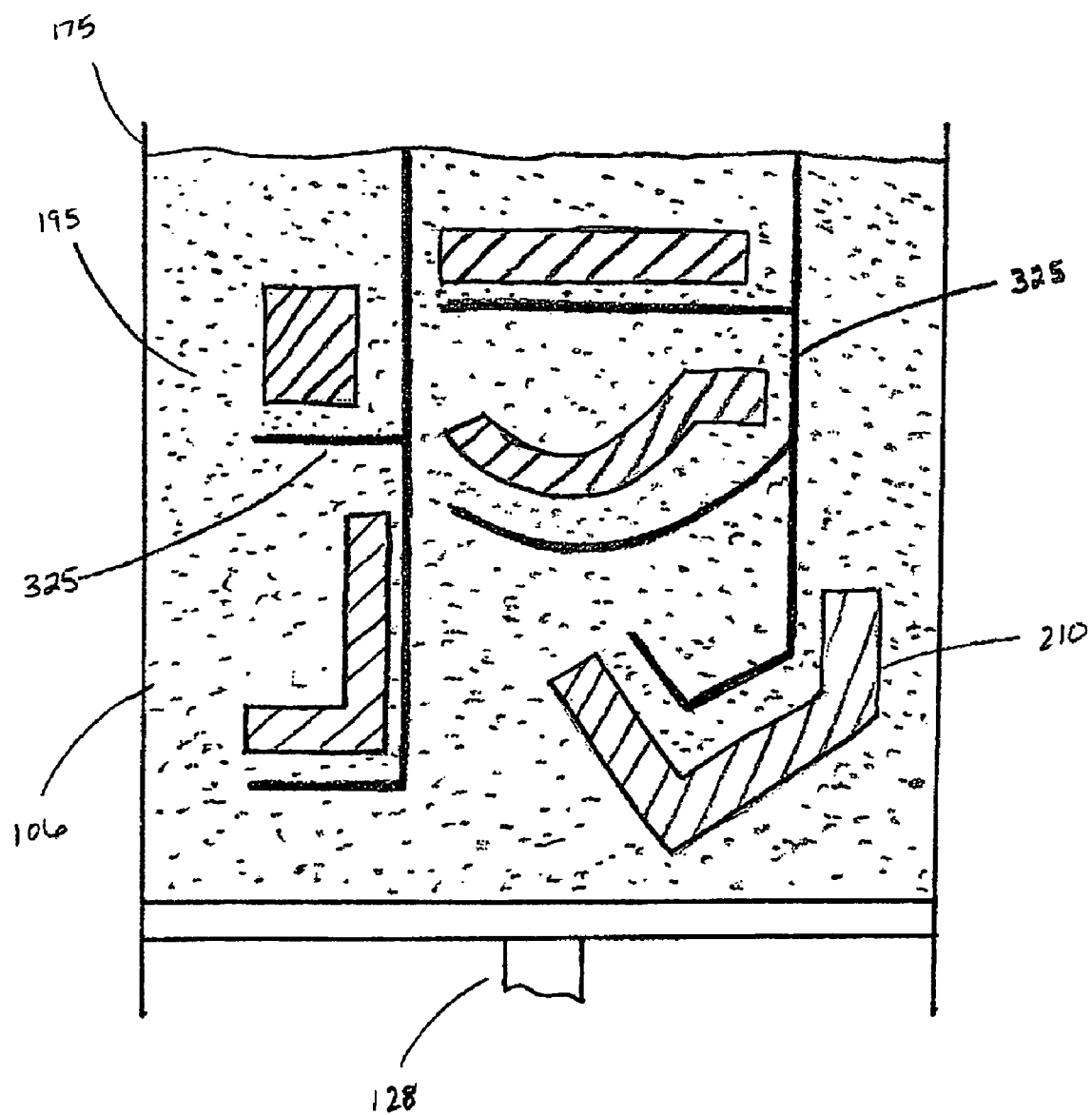

Having thus described the invention in general terms, reference will now be made to the accompanying drawings, wherein:

FIG. 1 is a diagrammatic front elevational view of a conventional selective laser sintering machine showing some of the mechanisms of the system;

FIG. 2 is cross-section through a vertical plane of a part-cake after a completed layerwise build process illustrating one embodiment of the invention wherein ducts have been formed in the part-cake and have been evacuated of unfused powder;

FIG. 3 is a cross-section through a vertical plane of a part-cake wherein the ducts remain filled with unfused powder and where the ducts have formed therein a powder removal device;

FIG. 4 is a detailed view of a portion of the duct from FIG. 3;

FIG. 5 is a cross-section through a vertical plane of a further embodiment of the invention wherein multi-walled ducts have been formed in the part-cake in a "core and cavity" system;

FIG. 6 is a detailed view of the bottom portion of the multi-wall ducts illustrated in FIG. 5 with the right-hand "core" shown partially removed;

FIG. 7 is a cross-section through a vertical plane of an embodiment of the invention wherein gaseous cooling media is used to cool the part-cake by being pumped into the part-cake through a porous duct;

FIG. 8 is a cross-section through a vertical plane of another embodiment of the invention wherein a multi-walled duct has been formed as a liquid cooling media reservoir;

FIG. 9 is a detailed view of a portion of the multi-wall duct of FIG. 8 particularly illustrating the annular space between the walls;

FIG. 10 is a cross-section through a vertical plane of a part-cake with a cooling system of another embodiment of the invention, particularly illustrating the use of alternate duct/reservoir formations and the use of a catch basin for protecting the unfused powder from liquid cooling media;

FIG. 11 is a cross-section through a vertical plane of a part-cake in a containing cylinder with permanent fittings in the cylinder sidewall and piston for connecting to the ducts formed within the part-cake;

FIG. 12 is a cross-section through a vertical plane of a part-cake wherein the thermal transfer channels are formed by the introduction of solid cooling media into the part-cake; and FIG. 13 is a cross-section through a vertical plane of a part-cake wherein the thermal transfer channels are conformal cooling fins formed during the layerwise build process.

DETAILED DESCRIPTION OF THE INVENTION

The invention now will be described more fully hereinafter with reference to the accompanying drawings, in which preferred embodiments of the invention are shown. These embodiments are provided so that this disclosure will be thorough and complete, and will fully convey the scope of the invention to those skilled in the art.

The invention is directed to methods and apparatus for selectively controlling the cooling rate of a part-cake in a laser sintering process. FIG. 1 illustrates a conventional selective laser sintering system currently sold by 3D Systems, Inc. (Valencia, Calif.). In FIG. 1, a front view of the apparatus is provided with the outer covering of the apparatus cut away to show the working parts of the system. Generally, a carbon dioxide laser and its associated optics is shown mounted in a unit above a process chamber that includes a powder bed, two feed powder cylinders, and a leveling roller. The process chamber maintains the appropriate temperature and atmospheric composition for the fabrication of the built parts. The atmosphere is typically an inert atmosphere, such as nitrogen. It is also possible to use a vacuum in the process chamber.

More specifically, in laser sintering system 100, a laser beam 104 is generated by laser 108 and aimed at target surface or area 110 by way of a scanning system 114 that generally includes galvanometer-driven mirrors that deflect the laser beam 104. The laser and galvanometer systems are isolated from the hot process chamber 102 by a laser window 116. The laser window 116 is situated within radiant heater elements 120 that heat the target area 110 of the part bed below. The deflection and focal length of the laser beam is controlled, in combination with the modulation of the laser, to direct laser energy to those locations of the fusible powder layer corresponding to the cross-section of the article to be formed in that layer.

Two feed systems (124 and 126) feed powder into the system by means of push up piston systems. A part bed 132 receives powder from the two feed pistons (125 and 127) as described immediately hereafter. Feed system 126 first pushes up a measured amount of powder from the powder in feed cylinder 123 and a counter-rotating leveling roller 130 picks up and spreads the powder over the part bed 132 in a uniform manner. The leveling roller 130 passes completely over the target area 110 and part bed 132. Any residual powder is deposited into an overflow receptacle 136. Positioned nearer the top of the process chamber 102 are radiant heater elements 122 that pre-heat the feed powder. After a traversal of the leveling roller 130 across the part bed 132, the laser selectively fuses the layer just dispensed. The leveling roller then returns from the area of the overflow receptacle 136, after which the feed system 124 pushes up a prescribed amount of powder from the powder in feed cylinder 129. The leveling roller 130 then dispenses powder over the target 110 in the opposite direction and proceeds to the other overflow receptacle 138 to deposit any residual powder. Before the leveling roller 130 begins each traverse of the system the center part bed piston 128 drops by the desired layer thickness to make room for additional powder. When the build process begins, the feed cylinders (123 and 129) are filled with unfused powder for supply to the part-cake 106, which is formed during the build process and includes unfused powder and built parts of fused powder. The cylinders can take on any shape useful for powder delivery.

The powder delivery mechanism in system 100 includes feed pistons 125 and 127, which are controlled by motors (not shown) to move upwardly and lift, when indexed, a volume of powder into chamber 102. Part-cake piston 128 is controlled by a motor (not shown) to move downwardly below the floor of process chamber 102 by a small amount, for example 0.125 mm, to define the thickness of each layer of powder to be processed. Target surface 110 refers to the top surface of heat-fusible powder (including portions previously fused, if present) disposed above part-cake piston 128; the fused and unfused powder disposed on part-cake piston 128 is shown in FIG. 1 as part-cake 106. Radiant heaters 122 over the feed pistons pre-heat the powder to minimize any thermal shock as fresh powder is spread over the recently sintered and hot target area 110. This type of dual piston feed system, providing fresh powder from below the target area, with heating elements for both feed beds and the part bed is implemented commercially in the Vanguard™ selective laser sintering system sold by 3D Systems, Inc. (Valencia, Calif.).

The above system generally describes a layerwise build process, wherein built parts are formed in the part-cake a layer at a time by laser sintering (i.e., fusion) of the loose powder. Upon completion of the build process, the part-cake includes unfused powder and one or more built parts of fused powder. The built parts can be at various positions within the part-cake. As previously noted, the part-cake, at the end of the build process, is in a heated state throughout, with the temperature generally being greater within the part-cake, particularly near the built parts. The part-cake must be allowed to cool to near ambient temperature before the built parts can be removed from the part-cake. This cooling time reduces the throughput of the system (i.e., reduces the net number of build processes that can be performed in a given time). The external portions of the part-cake tend to cool at a quicker rate than the internal portions of the part-cake, causing undesirable thermal gradients to form within the part-cake. For example, the top surface of the part-cake and the external portion of the part-cake in contact with the cylinder walls tend to cool quickly. These thermal gradients can lead to geometric distortions and inconsistent material properties in the built parts.

The invention is not limited by the type of powder used in the laser sintering process. Any powder commonly used in laser sintering can be used according to the invention, including but not limited: plastics (such as nylons); glass-filled plastics; elastomers; polycarbonates; ceramics; metals; polystyrene; and composite materials, such as polymer metals and polymer ceramics.

The invention provides methods for controlling the cooling rate of the part-cake by forming thermal transfer channels within the part-cake. The thermal transfer channels facilitate the movement of heat away from the interior portions of the part-cake. The channels can be, according to various embodiments, hollow ducts having substantially solid walls or substantially solid throughout. When the channels are hollow, the movement of heat can be further controlled through introducing various cooling media into the hollow channels, or ducts. The channels can be formed during the layerwise build process or can be formed after the build process. The channels can be formed prior to introduction of cooling media or can be formed simultaneously with the introduction of cooling media, particularly solid cooling media.

In one embodiment of the invention, the thermal transfer channels are formed in the part-cake during the laser sintering process, and the formed channels themselves are also formed by the laser sintering process. In other words, while the built parts are being formed in the layerwise build process through laser sintering, the thermal transfer channels are also being formed by laser sintering. Such channel formation is achieved through modification of the build file generation software used to direct the laser in the formation of the built parts. The software can be modified to include the thermal transfer channels in the same build file as the desired parts.

In one embodiment of the invention, the channels formed in the part-cake comprise hollow, solid-walled ducts. The ducts can be single-walled or multi-walled and can take on various conformations within the part-cake. For example, the ducts can be angular, linear, or curvilinear. Further, the dimensions of the ducts can vary, even within the same part-cake. For example, the ducts can be tapered, having a wider dimension at one point in the part-cake and gradually narrowing to a narrower dimension at another point in the part-cake. Additionally, the ducts can take on various geometries. For example, in cross-section, the ducts can be round, oval, rectangular, triangular, or any other such geometry that can be beneficial according to the invention.

One embodiment of the invention is provided in FIG. 2, which provides a cross-section through a vertical plane of a part-cake after completion of a layerwise build process. Part-cake 106 is illustrated with built parts 210 shown distributed throughout the part-cake 106 among the unfused powder 195. In areas of the part-cake 106 not occupied by the built parts 210, duct 200 has been formed. As previously stated, duct 200 is formed during the layerwise building process by laser sintering. While only one duct is shown in FIG. 2, it is understood that multiple ducts could be formed throughout the part-cake as beneficial for controlled cooling of the part-cake. Further, the ducts can be arranged in various, different planes throughout the part-cake.

Referring still to FIG. 2, the duct 200 has two terminal portions (202 and 204). According to one embodiment of the invention, the terminal portions of the duct 200 are formed to be located at the top portion of the part-cake 106. It is beneficial for at least one terminal portion of the ducts formed within the part-cake to be located at the top portion of the part-cake for ease of removal of the unfused powder inside the ducts. In further embodiments, discussed in greater detail below, the ducts can have one or more terminal portions within the part-cake. The ducts also can have one or more terminal portions at or near the walls of the cylinder 175 containing the part-cake or at or near the part-cake piston 128.

Upon completion of the layerwise build process, ducts formed within the part-cake remain filled with unfused powder. It is therefore beneficial to remove the unfused powder from the ducts prior to introducing cooling media into the ducts. In the embodiment shown in FIG. 2, the unfused powder has already been removed from duct 200. Various methods can be used for removing the unfused powder from the ducts and are encompassed herein by the invention. In one embodiment, the unfused powder can be removed by vacuum suction at one terminal portion of the duct. To accommodate ready attachment of a device, such as a vacuum, useful for removing unfused powder, at least one terminal portion of the duct can be formed to be a fitting suitable for such attachment. As seen in FIG. 2, terminal portion 202 of the duct 200 is formed to be a threaded fitting 207 for attachment of a powder removal device. Other fitting types can be formed for use in powder removal or for other purposes, such as introducing cooling media into the ducts.

Other methods for removing unfused powder from the ducts are also envisioned by the invention, including, but not limited to, forced air evacuation (which can be used alone or in combination with vacuum suction) and digging.

In one particular embodiment, a powder removal tool can be formed within the ducts for further removal of the unfused powder from the ducts. The powder removal tool is formed separate from the ducts but is formed within the ducts, by laser sintering, during the layerwise building process. A preferred embodiment of such a powder removal tool is illustrated in FIG. 3 as a pull chain assembly 230. FIG. 3 shows a cross-section through a vertical plane of a part-cake 106 having therein unfused powder 195, built parts 210, a duct 200, and the pull chain assembly 230 within the duct. As shown in FIG. 3, in addition to containing the pull chain assembly 230, the duct 200 still contains unfused powder 195 that is preferentially removed prior to introducing cooling media. For the sake of illustration, the pull chain assembly 230 can be likened to a "beaded chain" such as can commonly be found as an on/off pull chain on hanging light fixtures or ceiling fans or as was customarily found in times past for attaching to a drain plug for a bathroom tub or sink. In the embodiment illustrated in FIG. 3, the pull chain assembly 230 can be pulled from the duct 200, breaking up the unfused powder 195 and facilitating the removal of the unfused powder 195 from the duct 200. The pull chain assembly 230 is illustrated in FIG. 3 as a single, continuous chain; however other embodiments are also envisioned, such as two separate chains, each being pulled from separate terminal portions of the duct 200. A detailed view of the pull chain assembly 230 in the duct 200 is shown in FIG. 4.

After removal of the pull chain assembly 230 from the duct 200, any remaining unfused powder can be easily removed from the duct through additional means, such as by vacuum. Further, the powder removal tool can be formed such that it is capable of removing substantially all of the unfused powder in the duct. For example, as shown in FIG. 4, the pull chain assembly 230 can be further formed to include scrapers 235, which are essentially disks having outer dimensions that are approximately equivalent, but slightly less than, the inner dimensions of the duct 200. As pull chain assembly 230 is removed from the duct 200, the pull chain assembly 230 breaks up the unfused powder 195, and the scrapers 235 help convey the loosened unfused powder from the duct 200.

The powder removal tool can take on other embodiments in addition to the pull chain assembly described above, such additional embodiments also being encompassed by the invention. For example, in another embodiment, the powder removal tool can be a flexible auger. Preferentially, the auger is sufficiently flexible in bending but rigid in torsion such that rotating the shaft of the auger causes the auger to break up the powder in the duct and help to convey the loose powder out of the duct. The auger, as with the pull chain embodiment, can be formed during the layerwise building process by laser sintering within, but separate from, the ducts. Alternately, the auger could be a separate tool that is introduced into the ducts after the build process. As such, the advancement of the auger through the ducts would break up the powder and assist in conveying the powder mechanically out of the ducts. Further, vacuum suction could be used in conjunction with the auger, or with further mechanical powder removal embodiments.

Referring again to FIG. 2, after the unfused powder has been removed from the duct 200, cooling media can be introduced into the duct for controllably cooling the part-cake 106. The cooling media can be gaseous media or liquid media. In the embodiment shown in FIG. 2, the duct 200 has two terminal portions (202 and 204), both being at the top portion of the part-cake 106. In such an embodiment, a "cooling loop" is created within the part-cake 106. In the embodiment of FIG. 2, the cooling media can be liquid or gas cooling media, being introduced at one terminal portion of the duct 200 and removed at the other terminal portion of the duct 200.

When a liquid is used as the cooling media, any liquid generally known as useful in thermal transfer can be used so long as the liquid is non-reactive with the duct walls (i.e., the fused powder). Further, the liquid should not be capable of solubilizing the duct walls. In one preferred embodiment, the liquid cooling media is water. According to this embodiment, various additives, such as salts, can be added to the water as would be beneficial for improving the thermal transfer action of the water. In another embodiment, the liquid cooling media can be any other liquids having known heat transfer ability, including industrial coolants. Additionally, mixtures or solutions can be used as the liquid cooling media.

The liquid cooling media can be introduced through one of terminal portions 202 and 204 of duct 200. The cooling media can be circulated through the duct and removed from the other terminal portion of the duct 200. As previously noted, at least one of the terminal portions (202 and 204) of the duct 200 can be formed to be a fitting 207 for attaching useful devices, such as a coolant delivery or uptake device. Accordingly, in one embodiment of the invention, an external coolant supply and/or uptake line can be attached to the fitting 207, or other similar fitting formed on at least one of the terminal portions (202 and 204). In one particularly preferred embodiment, the terminal portions (202 and 204) are attached to an external heat exchanger (not shown) such that temperature-controlled liquid is introduced to the duct 200 at one of the terminal portions 202 and 204, and warmed liquid is removed from the other terminal portions. The warmed liquid is returned to the heat exchange device where it is again cooled to a controlled temperature for return to the duct 200 for cooling the part-cake 106.

In addition to introducing cooling media into the warmer interior of the part-cake, it is also advantageous, according to some embodiments of the invention, to control heat transfer at the exterior surfaces of the cylinder 175 containing the part-cake 106. Such heat transfer control at the exterior surfaces of the cylinder 175 can be useful for minimizing the thermal gradients that naturally occur by conduction through the cylinder to ambient surroundings and by natural or forced convection from the exterior walls of the cylinder to ambient surroundings. By applying uniform heat to the exterior walls of the part-cake containing cylinder 175, in addition to facilitating heat transfer in the interior of the part-cake with the thermal transfer channels, such as the ducts described above, it is possible to accurately control the thermal gradients throughout the part-cake, while simultaneously reducing the time required for cool down of the part-cake as compared to the non-assisted methods for cool down. In one embodiment of the invention, the method for controlling the cooling rate of the part-cake comprises applying heat to at least a portion of the cylinder containing the part-cake. In one particular embodiment, the external heat is applied as one or more heater bands that can be wrapped around the cylinder at one or more locations on the cylinder. In another embodiment, the heat could be supplied as a thermal blanket covering at least a portion of the cylinder, the blanket acting at an insulator alone or being capable of supplying added heat. In yet another embodiment, the heat could be supplied from external heaters not in physical contact with the cylinder, wherein the cylinder exterior is heated through convection or radiation. Other methods for supplying heat to the exterior of the part-cake containing cylinder would be recognized by one of skill in the art and are also encompassed herein. Application of the external heat source is beneficial for coordinating the cooling rate of the external portions of the part-cake with the cooling rate of the internal portions of the part-cake. The heat applied can be adjusted during the cooling time such that the applied heat is slowly reduced at a controlled rate. In one embodiment, the cooling rate is computer controlled such that the applied external heat is automatically reduced to correspond to the cooling rate of the internal portions of the part-cake.

The ducts formed within the part-cake by laser sintering during the layerwise build process can be single-walled ducts, such as illustrated in FIG. 2. Alternately, the ducts can also be multi-walled (i.e., one or more ducts within a duct). In such multi-walled embodiments, a cross section of the ducts (when the ducts have a round geometry) would appear as concentric circles. The formation of multi-walled ducts can be useful in various embodiments. For example, while the duct walls are solid, being formed of fused powder, the duct walls can be somewhat porous. Preferably, when the cooling media is a liquid media, it is beneficial for the duct walls to be non-porous, substantially preventing migration of the liquid cooling media from the ducts into the unfused powder.

The unfused powder from a normal laser sintering process can be recycled and used again in further build processes. It is generally undesirable for the liquid cooling media to contact the unfused powder, as powder that has been wetted with the cooling media must either be discarded or further processed prior to further use. In one embodiment, it is useful to form multi-walled ducts to further protect against migration of liquid cooling media through the duct walls and into the unfused powder.

Formation of multi-walled ducts can be useful in further embodiments for facilitating removal of the unfused powder from the ducts. One such embodiment is illustrated in FIG. 5, which shows a cross-section through a vertical plane of a part-cake after completion of a layerwise build process. In the embodiment of FIG. 5, a duct 200 has been formed by laser sintering during the build process. The duct 200 is selectively formed to be positionally related to the built parts 210 in the part-cake 106. The duct 200 is multi-walled, having an inner wall 221 and an outer wall 222. The duct 200 remains filled with unfused powder 195, the powder filling the space defined by the inner wall 221 and the space between the inner wall 221 and the outer wall 222.

In one particular embodiment, as shown in FIG. 5, the outer wall 222 of the duct 200 is continuous throughout the part-cake 106 having a V-shape and having two terminal portions 202 and 204 at the top portion of the part-cake 106. The inner wall 221 of the duct 200 is sealed and forms a closed terminal point for the inner wall 221 near the bottom most point of the duct 200 in the part-cake 106. This arrangement of the inner wall 221 can be seen more clearly in FIG. 6, which provides an enlarged view of the lower portion of the duct 200 in the part-cake 106.

The multi-walled duct shown in FIGS. 5 and 6 can generally be viewed as a "core and cavity" type arrangement. The inner wall 221 forms a "core" 225 of unfused powder encased in a solid wall 221 formed of fused powder. The core 225 can be pulled from the part-cake 106 as a single unit leaving an open "cavity" 226 defined by the outer wall 222 of the duct 200. Again, this is more easily seen in FIG. 6, wherein the core 225 on the right side of the part-cake 106 has been partially removed leaving behind the cavity 226, which is open and ready for introduction of cooling media. Likewise, the core 225 on the left side of the part-cake 106 is also removed. In one embodiment, the duct 200 is tapered, being narrowed near the bottom portion of the part-cake 106 and becoming widened toward the top portion of the part-cake 106. Such tapering of the duct 200 is particularly beneficial for aiding in removal of the core 225 as a single unit.

While the duct is formed as a multi-wall duct (i.e., a duct within a duct), removal of the core leaves a final duct that is single-walled. In further embodiments, the original multi-walled duct can be formed of three or more concentric ducts with the inner wall still defining a core for later removal. The subsequent removal of the core would leave behind a cavity as described above, but the final duct would remain a multi-wall duct throughout the part-cake.

Preferably, inner wall 221 and outer wall 222 are formed to be in close relation to one another but not physically connected. Forming the walls close together leaves less unfused powder 195 between the walls. After removal of the core 225, a small amount of unfused powder 195 can remain in the cavity 226. Such powder may be small enough in volume that leaving the powder in the cavity 226 will not interfere with the introduction of the cooling media. Alternately, if desired, the remaining unfused powder 195 can be removed from the cavity, such as through vacuum suction, and recycled for later use. Similarly, the unfused powder 195 in the core 225 can be recycled. Preferentially, the inner wall 221 is formed to be as thin as functionally possible to reduce the amount of powder used in forming the wall and minimize the amount of waste in the process. In this regard, it can also be beneficial to minimize the thickness of the outer wall 222; however, consideration must be made for keeping the outer wall 222 to a thickness useful for containing the cooling media and for preventing migration of liquid cooling media through the outer wall 222 and into the surrounding unfused powder 195. Preferably, the walls of the ducts according to the invention have a thickness of about 0.1 mm to about 10 mm, more preferably about 0.25 mm to about 5 mm, most preferably about 0.5 mm to about 1 mm.

As previously described, the cooling media introduced into the ducts can be gaseous or liquid. In one embodiment, the ducts are formed as shown in FIGS. 5 and 6 and liquid cooling media is introduced into the ducts. The liquid can be circulated through the ducts, being introduced at one terminal portion of the duct and removed at a second terminal portion of the duct.

Preferably, the ducts of the invention have sufficient structure to resist the compressive forces of the surrounding part-cake and remain open. This is generally not a great concern when liquid cooling media is used, as the duct walls are of sufficient thickness to prevent migration of liquid through the walls. When the ducts are filled with liquid, the ducts have the additional structural support provided by the liquid.

According to another embodiment of the invention, ducts are formed in the part-cake, and pressurized gas is pumped through the ducts, the gas migrating out of the duct, through the part-cake, and back to the atmosphere at the top portion of the part-cake. While the duct walls must still have sufficient structure to resist the compressive forces of the surrounding part-cake and remain open, the walls must be porous enough to allow air, or other temperature-controlled gas, to be pumped at slight pressure through the ducts and into the part-cake. Such porosity can be inherent to the duct walls formed of fused powder. Further, the duct walls could be purposely formed with openings in the walls sufficient for allowing pressurized gas to migrate out of the duct into the part-cake while disallowing unfused powder from the part-cake to move into the duct.

One particular embodiment of the method for controllably cooling the part-cake using gaseous cooling media and gas-permeable ducts is shown in FIG. 7, which provides a cross-section through a vertical plane of a part-cake 106 within a cylinder 175 after a completed build process. The part-cake 106 includes unfused powder 195 and built parts 210 formed during a layerwise build process. Also shown are ducts 200. In one preferred embodiment, the ducts 200 are formed during the layerwise build process. The duct 200 on the left side of the part-cake 106 is shown as formed, with unfused powder 195 remaining in the duct area defined by the duct walls. The duct 200 on the right side of the part-cake 106 has had the unfused powder removed from the duct, preferably using a method as described herein.

The ducts 200 shown in FIG. 7 are vertical and straight, each duct having one open terminal portion at the top portion of the part-cake 106 and one closed terminal portion within the part-cake 106. Other duct geometries and orientations are also encompassed by the invention. For example, the ducts could be formed diagonally or could be angular or substantially curvilinear. In the closed end form, however, straight ducts are preferred for ease of removal of the unfused powder within the ducts. As previously described, when the ducts are formed by laser sintering during the layerwise build process, a powder removal tool could be formed within the duct to aid in removal of the unfused powder.

Referring again to FIG. 7, the tops of the ducts 200 are preferentially formed for easy attachment to a gas delivery source. Preferably, after attachment to the gas delivery source, the tops of the ducts are sealed (i.e., air-tight) disallowing escape of temperature controlled gas introduced into the ducts. Accordingly, the only exit for the gas from the ducts is through the porous walls and into the part-cake. The tops of the ducts could be formed to be threaded or formed to have a "quick-connect" type structure. The duct 200 on the right side of the part-cake 106 is shown with the unfused powder removed from the top portion of the duct 200 and a gas delivery attachment 250 connected thereto. Beneficially, the gas delivery attachment 250 seals the originally open top of the duct 200 against the pressure of the gaseous cooling media later introduced. A return portal for the introduced gas is unnecessary as the return path for the pressurized gas is to flow through the porous walls of the duct 200, through the unfused powder 195 in the part-cake 106, and to the atmosphere at the open, top portion of the part-cake 106. Such flow is exemplified in FIG. 7 by the wavy arrows. The gaseous media, migrating through the unfused powder 195 and around the built parts 210, aids in the transference of heat away from the interior of the part-cake 106 to the atmosphere. In one embodiment, the gaseous cooling media is at ambient temperature. In another embodiment, the gaseous cooling media is cooled in a temperature controlled fashion below ambient temperature prior to introduction to the ducts 200. Such embodiments are particularly useful when the built parts 210 in the part-cake are robust (i.e., are of substantial structure, such as being solid throughout or having all parts being of substantial thickness). In embodiments wherein the built parts 210 are less robust (i.e., particularly small, intricate, or thin-walled parts), it is preferred to control the temperature of the gaseous media such that when the gas is introduced to the part-cake, the gas temperature is close to the temperature of the part-cake 106. Thereafter, the temperature of the gaseous media can be controllably reduced, such as in a step-wise fashion, to ambient temperature, or below.

Any gaseous media, such as atmospheric air, could be used in the invention as a coolant so long as the gaseous media did not adversely react with the unfused powder or the built parts. In one embodiment, the gaseous media comprises an inert gas, such as nitrogen gas. Use of an inert gas as the gaseous cooling media is particularly preferred as oxidation, or other similar chemical reactions, might occur with the introduction of a more reactive gas, such as oxygen-containing atmospheric air, into the warm part-cake.

As noted above, the gaseous media introduced into the ducts in the embodiments of the invention as illustrated in FIG. 7 is preferentially pressurized. The pressure is generally kept low enough so as to allow for slow movement of the gaseous media through the unfused powder in the part-cake without over-fluidizing the powder. Using a pressure that is too great can lead to cooling of the part-cake that is too rapid, which can also lead to unfavorable thermal gradients within the part-cake. The pressure is also kept low to avoid disrupting the integrity of the part-cake, blowing unfused powder up out of the part-cake and into the atmosphere. Such extreme pressure could also lead to damage to the built parts. Preferentially, the pressure of the gaseous media introduced into the ducts is any positive pressure sufficient to force migration of the gas from the duct into the part-cake yet remaining within the above-noted limitations.

In yet another embodiment of the invention, the ducts used in cooling the part-cake can be straight, as illustrated in FIG. 7, but be formed for introduction of liquid cooling media. One such embodiment is illustrated in FIG. 8, wherein there is shown a cross-section through a vertical plane of a part-cake having a cooling duct formed therein.

As shown in FIG. 8, the part-cake 106 is contained in cylinder 175 and includes built parts 210 and unfused powder 195. Also included is duct 200, which is preferentially formed during the layerwise build process. The duct 200 is straight and, preferentially, tapered. As shown in FIG. 8, the duct 200 is multi-walled, having an inner wall 221, and an outer wall 222. While such construction is preferred, particularly when introducing liquid cooling media, the duct 200 could also be of single-wall construction. In multi-wall embodiments, the outer wall 222 can comprise two or more walls.

The duct 200 has an open, upper terminal portion at the upper portion of the part-cake 106 and a closed, lower terminal portion within the part-cake 106. The unfused powder has been removed from the area of the duct defined by the inner wall 221. This area defined by the inner wall 221 essentially forms a reservoir 270 within the duct 200. As the inner wall 221 and the outer wall 222 are formed parallel to one another, an annular space 275 exists between the inner wall 221 and the outer wall 222. The liquid cooling media can be introduced into the reservoir 270 for drawing heat away from the part-cake 106 and into the cooling media.

In one particular embodiment, a temperature-controlled liquid is introduced into the reservoir 270, and the fluid is circulated within the reservoir 270. While only a single reservoir is illustrated in FIG. 8 and described herein, it is understood that the invention further encompasses methods wherein multiple reservoirs are formed in the part-cake 106. The temperature-controlled liquid can be circulated within the reservoir 270 with the aid of an external heat exchange device (not shown), such as a refrigerated pump system. The temperature-controlled liquid media could be pumped into the reservoir 270 through a supply line 260 and pumped out of the reservoir 270 through a return line 262. Preferentially, the supply line 260 is situated near the bottom of the reservoir 270 and the return line 262 is situated near the top of the reservoir 270. The reservoir 270 can be initially filled with the liquid cooling media, with the external circulation system delivering a constant flow of temperature-controlled liquid to the bottom the reservoir 270 and removing fluid from the top of the reservoir that has been warmed through heat exchange with the inner wall 221 of the duct 200, drawing heat from the part-cake 106. Such circulation of the liquid cooling media is illustrated in FIG. 8 with the arrows showing movement of the liquid in the reservoir 270. In other embodiments, the supply line 260 and the return line 262 could be placed at varying depths in the reservoir 270 as would be recognized by one of skill in the art as being beneficial for efficiently removing heat from the part-cake in a useful, controlled manner.

In the embodiment illustrated in FIG. 8, the duct 200 with the reservoir 270 formed therein essentially spans the part-cake 106 vertically from top to bottom, thereby removing heat from a greater proportion of the part-cake 106. In other embodiments, the reservoirs formed in the part-cake could terminate at varying depths within the part-cake depending upon the thermal environment desired to be produced at different locations throughout the part-cake. The reservoirs can take on varying shapes and orientations and need not necessarily be straight or strictly vertical. Rather, so long as the unfused powder can be removed from the reservoir and the top of the reservoir is formed to be level with the top of the part-cake, above the part-cake, or sealed against escape of the cooling media into the part-cake, the reservoirs can be of any shape and orientation within the part-cake.

The ducts formed for use as reservoirs for liquid cooling media can be single-wall ducts, as this reduces the volume of unfused powder used in the cooling method that must be discarded as waste. However, even when the ducts are formed such that the walls are non-porous, under some process conditions, the duct walls may not have sufficient integrity to completely prevent migration of liquid cooling media through the duct walls. If such migration occurs, the unfused powder around the duct walls could be wetted by the liquid, require disposal of the powder or further processing of the powder prior to reuse. Accordingly, in some embodiments, it can be beneficial to form multi-wall ducts, such as the dual-wall duct illustrated in FIG. 8. As shown in FIG. 8, while the unfused powder is removed from the area defined by the inner wall to leave a reservoir therein, unfused powder remains in the annular space(s) between the inner wall and the one or more outer walls.

FIG. 9 provides a detailed view of a portion of the duct and part-cake from FIG. 8. As shown in FIG. 9, the annular space 275 between the inner wall 221 and the outer wall 222 remains filled with unfused powder 195. Any liquid cooling media migrating from the reservoir 270 through the inner wall 221 becomes trapped in the annular space 275 and does not proceed to migrate through the outer wall 222 and into the remaining unfused powder 195 in the part-cake 106. The liquid is absorbed by the unfused powder in the annular space 275, wicking through the dry powder and evaporating to the atmosphere out the top portion of the annular space 275 at the top portion of the part-cake 106. This multi-wall/powder-filled annular space combination provides protection to the unfused powder 195 in the remaining portion of the part-cake 106 and also provides an additional cooling effect through the wicking action.

FIG. 10 illustrates additional embodiments of the invention using ducts/reservoirs to contain liquid cooling media. FIG. 10 is similar to FIG. 9 in providing a cross-section through a vertical plane of a part-cake 106 and the contents thereof following a layerwise build process. As seen in FIG. 10, the duct 200 formed in the layerwise build process can be a single-wall duct having an open top terminal portion and a closed bottom terminal portion, the walls thereof forming a reservoir 270 for containing liquid cooling media. The reservoir 270 illustrates one of the additional various shapes possible with the formed ducts of the invention.

As further illustrated in FIG. 10, in one embodiment, during the build process, a tray or catch basin 290 can be formed. Preferably, the catch basin 290 seals off the top layer of unfused powder 195 in the part-cake 106 and is integrally connected to the top of the duct 200. The catch basin 290 can cover only a portion of the top of the part-cake 106 in the area around the top of the duct 200, leaving open to the atmosphere at least part of the top portion of the part-cake 106. If desired, the catch basin 290 can cover the entire top surface of the part-cake 106. The catch basin 290 protects the underlying unfused powder 195 from any liquid cooling media escaping from the reservoir 270 due to splashing or due to the flow/pumping action associated with the use of an external pumping device as described above.

In the various embodiments described above, the ducts comprising the thermal transfer channels can be formed by laser sintering during the layerwise build process. Such formation is particularly beneficial in that the ducts can be formed to any shape, size, conformation, or position useful for controllably cooling the part-cake and the components contained therein. Generally, as described above, the ducts are formed during the layerwise build process, and after the build process is complete, the unfused powder is removed from the ducts and the cooling media is introduced. In particular embodiments of the invention, the ducts have only one opening (generally at the top portion of the part-cake) for introducing and removing the cooling media. In other embodiments, the ducts have two or more openings at the top portion of the part-cake, wherein cooling media can be introduced at one opening and removed at another opening (providing a flow-through system).

According to another embodiment of the invention, the ducts can have two or more openings forming a flow-through system, wherein at least one opening is within the part-cake, preferentially being at or near the sidewalls of the cylinder containing the part-cake or the piston forming the bottom of the cylinder. One particular embodiment having such a structure is provided in FIG. 1, which provides a cross-section through a vertical plane of a part-cake 106 contained within a cylinder 175 defined by cylinder sidewalls 177 and piston 128. Contained within the part-cake 106 are unfused powder 195 and built parts 210.

As can be seen in FIG. 11, the laser sintering apparatus used in the layerwise build process is particularly characterized by the presence of permanent fittings 350 in the cylinder sidewalls 177 and the piston 128. Such fittings can be strategically placed at various locations in the sidewalls, 177, the piston 128, or both, preferentially being at spatial positions identified in the build software used to form the ducts. The fittings 350 are preferably standardized for being easily connected to tubing or other attachments useful for removing unfused powder 195 from the ducts 200 or introducing cooling media into the ducts 200. The fittings 350 can take on various types, shapes, and structures, all of which are encompassed by the invention.

With the fittings 350 permanently placed in the cylinder sidewalls 177 and piston 128, the ducts 200 can be formed during the layerwise build process to have at least one terminal portion in alignment with a permanent fitting 350. In one embodiment, the ducts 200 are formed to have one terminal portion in alignment with a fitting 350 and one terminal portion at the top portion of the part-cake 106. According to this embodiment, the fitting 350 could be in the cylinder sidewall 177 or the piston 128. In another embodiment, the ducts 200 are formed to have one terminal portion in alignment with one fitting 350 and one terminal portion in alignment with another fitting 350. As illustrated in FIG. 11, the ducts 200 can take on multiple conformations being, for example, straight and vertical or curvilinear. In one embodiment, the ducts 200 are formed to be at least partially conformal with the built parts 210. The ducts 200 also could be straight and horizontal being formed between two fittings 350 in the cylinder sidewalls 177 on opposite sides of the cylinder 175.

Once the build process is complete and the ducts 200 have been formed in the part-cake 106, the ducts can be cleared of unfused powder 195 to prepare for introduction of cooling media. The fittings 350 can comprise caps or other means for preventing unfused powder from entering the fitting 350 prematurely. The ducts 200 also can be formed to have a solidified portion immediately adjacent the fitting 350. Once the build process is complete, the cap can be removed or the solidified portion at the end of the duct 200 can be broken away to allow access to the unfused powder 195 in the ducts 200. The unfused powder 195 can then be removed, such as through vacuum suction. Where both terminal portions of the duct 200 are at a fitting 350, the unfused powder 195 can be removed through application of vacuum suction at one fitting 350 and application of pressurized gas at the other fitting 350. Methods of powder removal as described in relation to additional embodiments herein also can be used according to the embodiment. For example, a powder removal tool can be formed within the ducts to aid in breaking up the powder and removing it from the ducts.

Preferentially, when fittings are present in the cylinder sidewalls, the fittings at the interior portion of the sidewall are flush with the sidewall, as shown in FIG. 11. Such conformation avoids interference of the fittings with the movement of the piston within the cylinder, the outer edges of the piston being in sealable contact with the cylinder sidewalls to prevent loss of powder around the piston.

As with the additional embodiments described herein wherein the thermal transfer channels are formed as ducts, the cooling media introduced can vary depending upon the desired cooling rate and the structure of the ducts formed in the part-cake. The temperature-controlled cooling media is preferentially gaseous media or liquid media.

According to further embodiments of the invention, the thermal transfer channels can be formed after completion of the layerwise build process used to form the built parts in the part-cake. In one particular embodiment, where solid cooling media are used, the thermal transfer channels are formed simultaneously with the introduction of the solid cooling media. Such embodiments are illustrated in FIG. 12, which shows a cross-section through a vertical plane of a part-cake 106 having therein unfused powder 195 and built parts 210. For controllably cooling the part-cake, the figure further shows solid cooling media (305 and 307) introduced to the part-cake 106. According to this embodiment, the solid cooling media (305 and 307) are pushed into the unfused powder 195 in the part-cake 106, with care given to avoid direct contact with the built parts 210. The mechanical force used to introduce the solid cooling media (305 and 307) into the part-cake 106 forms the channels for containing the solid cooling media (305 and 307) by displacing the unfused powder 195.

FIG. 12 illustrates an embodiment wherein thermal transfer channels have been formed in the part-cake 106 simultaneously with the introduction of solid cooling media (305 and 307). As further illustrated in FIG. 12, the solid cooling media (305 and 307), and the thermal transfer channels formed by the introduction of the solid cooling media (305 and 307) into the part-cake 106, can be of varying depths, so long as at least a portion of the solid cooling media (305 and 307) is introduced into the part-cake 106. It is not necessary for the solid cooling media and the thermal transfer channels to be vertically disposed.

Any suitable solid cooling media can be used according to the invention. In one particular embodiment, the solid cooling media comprises a heat pipe 305. A heat pipe is a generic term used to describe devices that can quickly transfer heat from one point to another. Heat pipes generally consist of a sealed container, a working fluid within the container, and a wick or capillary structure within the container. Heat pipes can effectively transport heat against gravity by an evaporation-condensation cycle with the help of porous capillaries that form the wick. The wick provides the capillary driving force to return condensate to an evaporator. The quality and type of wick usually determines the performance of the heat pipe.

According to another preferred embodiment, the solid cooling media comprises a thermally conductive probe 307. A thermally conductive probe is generally simpler in construction than a heat pipe, often simply comprising a metal tube or rod. Preferentially, the metal has a high thermal conductance, such as copper or aluminum. In a further preferred embodiment, the thermally conductive probe 307 can be connected to an external heat exchange device, such as a temperature-controlled active cooling system. In this embodiment, thermal energy is conducted from the warmer portions of the part-cake 106 to the cooler thermally conductive probe 307 or heat pipe 305. The heat is then conducted from the thermally conductive probe 307 to the atmosphere or dissipated in the internal heat exchange system of the heat pipe 305. Where the thermally conductive probe 307 is connected to a temperature-controlled active cooling system, the heat is conducted from the probe 307 to the cooling system.

In another embodiment of the invention, the thermal transfer channels can themselves be at least partially solid. In such embodiments, the introduction of cooling media is not required, as the solid thermal transfer channels function to facilitate the movement of heat out of the part-cake, generally out to the atmosphere. One such embodiment is illustrated in FIG. 13, wherein there is shown a cross-section through a vertical plane of a part-cake 106 contained in a cylinder 175 and having therein unfused powder 195 and built parts 210 formed during a layerwise build process. In the embodiment illustrated in FIG. 13, the thermal transfer channels are present as cooling fins 325. In this embodiment, the cooling fins comprise fused powder and are formed by laser sintering in the layerwise build process.

It is known that the solidified materials formed in the laser sintering process are generally significantly more thermally conductive than the unfused powder 195. Cooling fins 325 can be generated automatically by software, or manually added to the build file, at desired locations in the part-cake 106 relative to the built parts 210. During the building process, the cooling fins 325 can be built in close relation to specific areas of the part-cake 106, such as around the built parts 210, where increased cool down is desired. The cooling fins 325 provide paths of increased thermal conduction and can be formed to continue from the areas where increased cool down is desired up to the surface of the part-cake. In a particular embodiment, the cooling fins 325 are at least partially conformal in nature, being shaped to at least partially conform to the shape of one or more of the built parts 210 in the part-cake 106. In another embodiment, the terminal portions of the cooling fins at the top portion of the part-cake 106 can be physically connected to relatively cooler thermal sinks (not shown), which draw thermal energy out of the part-cake 106, in particular from the desired specific areas in need of increased cool down.

As shown in FIG. 13, the cooling fins 325 can take on various forms. For example, the cooling fin can comprise a single continuous piece of fused powder in taking on various combinations of angled, linear, and curvilinear formations. The cooling fin can comprise a branched structure with a main body with one or more branches extending therefrom throughout the part-cake. To even further control the cool down rate of the part-cake, it may be advantageous to form multiple individual cooling fins throughout the part-cake, each extending up to the surface of the part-cake. Other advantageous conformations could be envisioned by one of skill in the art and are also encompassed by the invention.

According to another embodiment of the invention, the thermal transfer channels comprise ducts that are formed in the part-cake after the layerwise build process is completed. As previously described in relation to other embodiments of the invention, when the thermal transfer channels comprise ducts, the ducts can advantageously be formed during the layerwise build process through laser sintering. In this embodiment, the ducts can be formed by digging paths through the unfused powder in the part-cake and inserting pre-made components, such as flexible tubing, into the dug paths.

In one particular embodiment, a "directional drilling" system can be used to steer a boring head, or drill bit, through the part-cake. As the boring head moves through the part-cake, unfused powder is removed leaving an open path through the part-cake. Afterward, a solid, flexible tube (or other duct-like apparatus) can be inserted in the path. In a particularly preferred embodiment, the boring head, while boring out the path, simultaneously pulls the tubing behind, immediately filling the bored out path with the tube, thereby forming a duct-like thermal transfer channel throughout the part-cake. Advantageously, the boring system is computer controlled through programming capable of monitoring the bore head's position in three-dimensional space within the part-cake and steering the bore head through the part-cake to form the ducts near and around the built parts without damaging the parts. Once the ducts have been formed by boring out the paths and placing the tubing therein, cooling media can be introduced into the ducts for facilitating cooling of the part-cake.

The formation of thermal transfer channels within the part-cake is beneficially performed under computer control. For example, when the thermal transfer channels are ducts formed of fused powder, the placement of the ducts can be mapped in relation to the built parts to be formed in the build process. The ducts are made part of the build file and are generated automatically during the build process. Similarly, when the thermal transfer channels are cooling fins, the placement of the fins can be mapped in relation to the build parts and made part of the build file to be formed automatically during the build process. When the thermal transfer channel are formed after the build process, such as through the use of a boring head to dig tunnels and place tubing therein, a computer is beneficially used to interpret the build file to map the location of the built parts within the part-cake. The computer can guide the bore head through the part-cake avoiding the built parts while forming the thermal transfer channels in advantageous proximity to the built parts for controlling the cooling of the part-cake.

In addition to the above, in particularly preferred embodiments, placement of thermal transfer channels throughout the part-cake can be automatically generated by a combination of the normal build-file generation software with additional analytical software, such as thermal analysis software or computational fluid dynamics software. Such combination can advantageously place the thermal transfer channels in optimized positions and routings throughout the part-cake. The optimized positions and routings are particularly beneficial for minimizing geometric distortions of the built parts and maximizing the cooling rate of the part-cake. The laser sintering system according to the invention exhibits reduced process time and increased throughput without having adversely affected built part geometry or accuracy.

Many modifications and other embodiments of the invention will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method for controllably coaling at least a portion of a part-cake having therein unfused powder and one or more built parts formed during a layerwise build process, the method comprising:

forming one or more ducts in areas of the part-cake not occupied by the built parts, said forming being by laser sintering during the layerwise build process;

removing unfused powder from the one or more ducts; and introducing cooling media into the one or more ducts.

2. The method of claim 1, wherein the one or more ducts are single-wall ducts.

3. The method of claim 1, wherein the one or more ducts are multi-wall ducts.

4. The method of claim 1, wherein each of the one or more ducts includes two terminal portions at an open surface of the part-cake.

5. The method of claim 4, wherein the terminal portions of the one or more ducts are formed for attachment to a cooling media delivery apparatus.

6. The method of claim 1, wherein the part-cake is within a cylinder, and the one or more ducts include at least one terminal portion formed for attachment to a permanent fitting built into the cylinder.

7. The method of claim 1, wherein the one or more ducts are curvilinear.

8. The method of claim 7, wherein the one or more ducts are formed to at least partailly conform to the spatial position of the one or more built parts within the part-cake.

9. The method of claim 1, further comprising forming a powder removal tool by laser sintering within the one or more ducts during the layerwise build process.

10. The method of claim 9, wherein said step of removing unfused powder from the one or more ducts includes removing the powder removal tool from the one or more ducts.

11. The method claim 1, wherein said step of removing unfused powder from the one or more ducts includes applying a vacuum to the one or more ducts.

12. The method of claim 1, wherein the cooling media is a liquid.

13. The method of claim 1, wherein the one or more ducts comprise an inner wall and one or more outer walls, and the unfused powder is removed from the space of the one or more ducts formed of the inner wall.

14. The method of claim 1, wherein the one or more ducts are semi-gas permeable

15. A method for controllably cooling at least a portion of a part-cake having therein unfused powder and one or more built parts formed during a layerwise build process, the method comprising:
   forming one or more ducts in areas of the part-cake not occupied by the built parts, said forming being by laser sintering during the layerwise build process;
   forming a powder removal tool by laser sintering within the one or more ducts during the layerwise build process;
   removing unfused powder from the one or more ducts by removing the powder removal tool from the one or more ducts; and
   introducing cooling, media into the one or more ducts.

16. The method of claim 15, wherein the powder removal tool comprises a pull chain assembly.

17. The method of claim 15, wherein the powder removal tool comprises an inner wall defining an inner duct that is generally filled with unfused powder.

18. The method of claim 15, wherein each of the one or more ducts includes two terminal portions at an open surface of the part-cake.

19. The method of claim 18, wherein the terminal portions of the one or more ducts are formed for attachment to a cooling media delivery apparatus.

20. The method of claim 15, wherein the powder removal tool comprises a core that can be pulled from the duct to define a cavity within the duct.

21. The method of claim 15, wherein the one or more ducts are curvilinear.

22. The method of claim 21, wherein the one or more ducts are formed to at least partially conform to the spatial position, of the one or more built parts within the part-cake.

23. The method of claim 15, wherein said step of removing unfused powder from the one or more ducts includes applying a vacuum to the one or more ducts.

24. The method of claim 15, wherein the cooling media is a liquid.

25. The method of claim 15, wherein the powder removal tool comprises a tapered outer surface that is narrowed near a bottom portion of the part cake relative to the tool outer surface proximate the top portion of the part cake.

* * * * *